United States Patent [19]

Numazawa et al.

[11] Patent Number: 4,860,607
[45] Date of Patent: Aug. 29, 1989

[54] AUTOMATIC TRANSMISSION FOR AUTOMOTIVE VEHICLE

[75] Inventors: Akio Numazawa, Nagoya; Akira Sato, Susono; Fumihiro Ushijima, Okazaki, all of Japan

[73] Assignee: Toyota Jidosha Kabushiki Kaisha, Toyota, Japan

[21] Appl. No.: 64,134

[22] Filed: Jun. 19, 1987

[30] Foreign Application Priority Data

Jun. 20, 1986 [JP] Japan .................. 61-145930
Sep. 24, 1986 [JP] Japan .................. 61-225644

[51] Int. Cl.$^4$ .................. F16H 3/08; F16H 5/42; F16H 5/60; F16D 67/00
[52] U.S. Cl. .................. 74/330; 74/336 R; 192/3.58; 192/3.61
[58] Field of Search .................. 74/330, 335, 336 R, 74/337, 340, 339, 665 B; 192/3.58, 3.61

[56] References Cited

U.S. PATENT DOCUMENTS

| | | | |
|---|---|---|---|
| 2,086,600 | 7/1937 | Burtnett | 74/330 |
| 2,205,832 | 6/1940 | Henriod | 74/330 |
| 2,570,192 | 10/1951 | Beckwith | 74/330 |
| 2,899,834 | 8/1959 | Polomski | 74/330 |
| 4,442,727 | 4/1984 | Young | 74/337 |
| 4,457,185 | 7/1984 | Yoshida et al. | 74/336 R |
| 4,544,057 | 10/1985 | Webster et al. | 192/76 |
| 4,573,371 | 3/1986 | Akutagawa | 74/339 |
| 4,616,521 | 10/1986 | Akashi et al. | 74/335 |
| 4,627,312 | 12/1986 | Fujieda et al. | 74/336 R |
| 4,700,819 | 10/1987 | Nishikawa et al. | 192/3.58 |
| 4,723,643 | 2/1988 | Numazawa et al. | 192/3.58 |

FOREIGN PATENT DOCUMENTS

| | | | |
|---|---|---|---|
| 0593757 | 3/1960 | Canada | 74/330 |
| 58-193951 | 2/1982 | Japan . | |
| 0091950 | 7/1983 | Japan | 74/339 |
| 6145163 | 8/1984 | Japan . | |
| 0846335 | 7/1981 | U.S.S.R. | 74/330 |

Primary Examiner—Rodney H. Bonck
Assistant Examiner—Harold F. Macris
Attorney, Agent, or Firm—Oblon, Spivak, McClelland, Maier & Neustadt

[57] ABSTRACT

An automatic transmission for an automotive vehicle, having an input shaft connected to an engine of the vehicle via a primary clutch, an output shaft parallel to the input shaft and operatively connected to drive wheels of the vehicle, a plurality of pairs of gears for transmitting a drive force of the input shaft to the output shaft at different speed reduction ratios, respectively, at least one shift member for selectively placing the individual pairs of gears into an operative position, and an actuator device for automatically activating each shift member. The transmission includes a secondary clutch connected to the primary clutch by the input shaft, and disposed between the input and output shafts, an intermediate shaft disposed in a transmission line between the input and output shafts. The intermediate shaft is provided with one of the gears of each of at least one of the pairs of gears. The transmission further includes a one-way clutch disposed between the intermediate shaft and one of the input and output shafts. The one-way clutch permits power to be transmitted only in a direction from the input shaft toward the output shaft. Each pair of gears is placed into its operative position by the actuator device, with the secondary clutch being partially engaged while the primary clutch is held fully engaged.

15 Claims, 13 Drawing Sheets

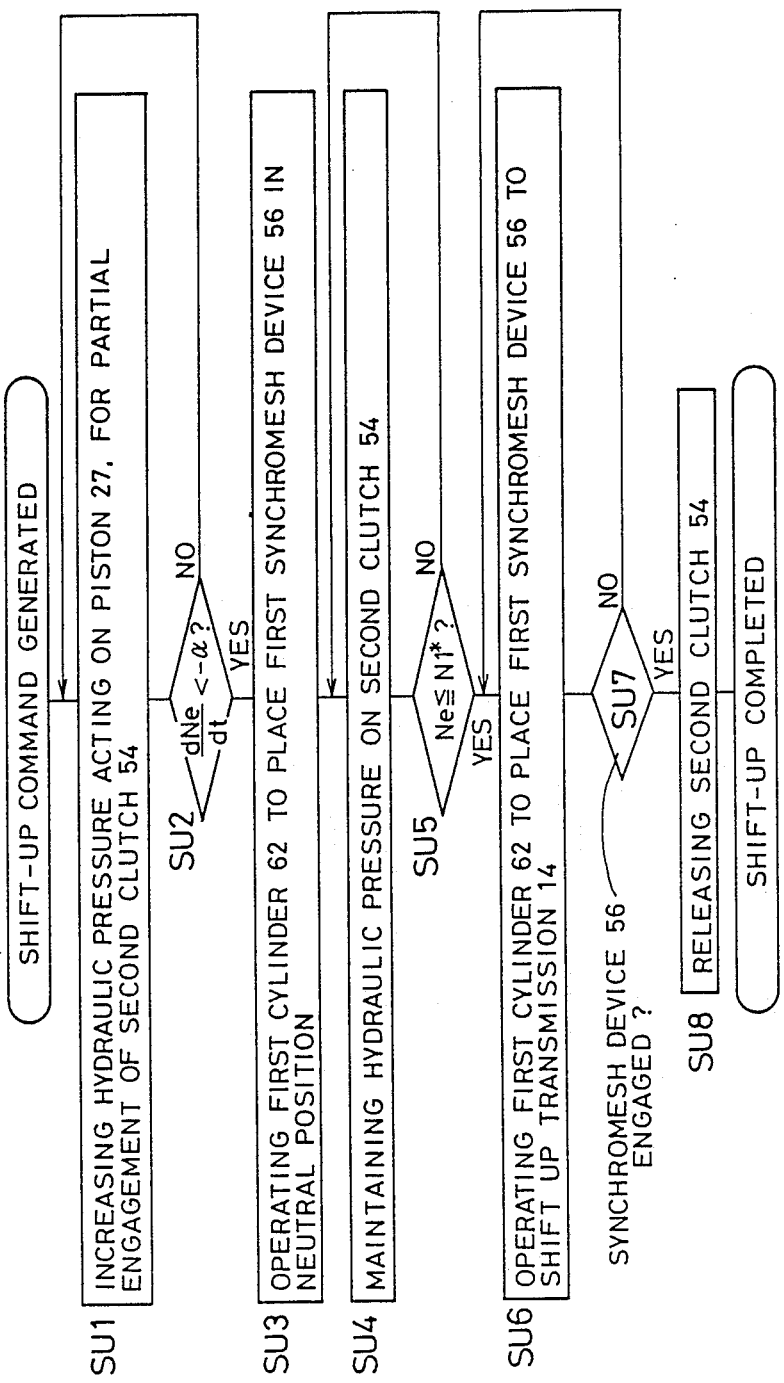

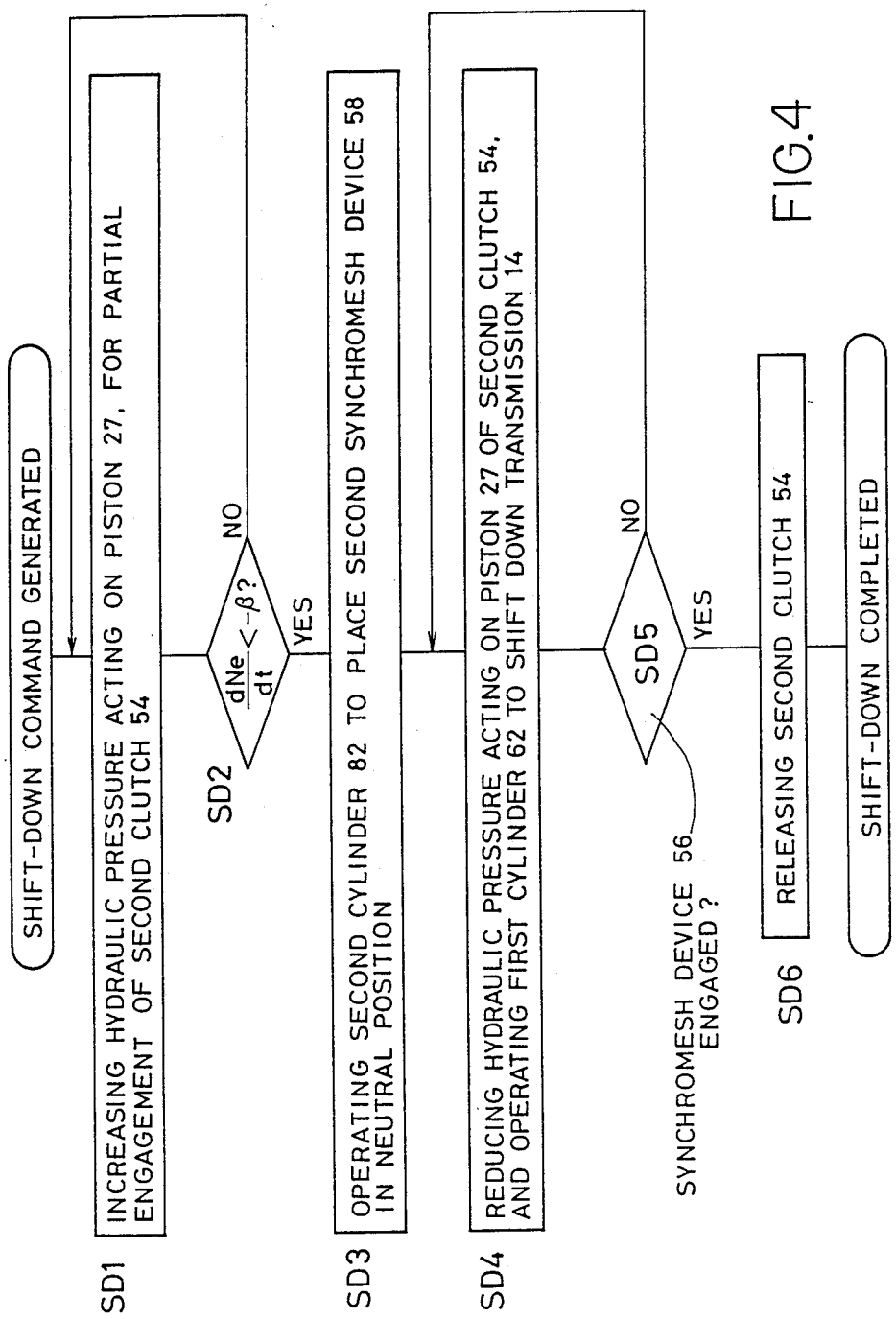

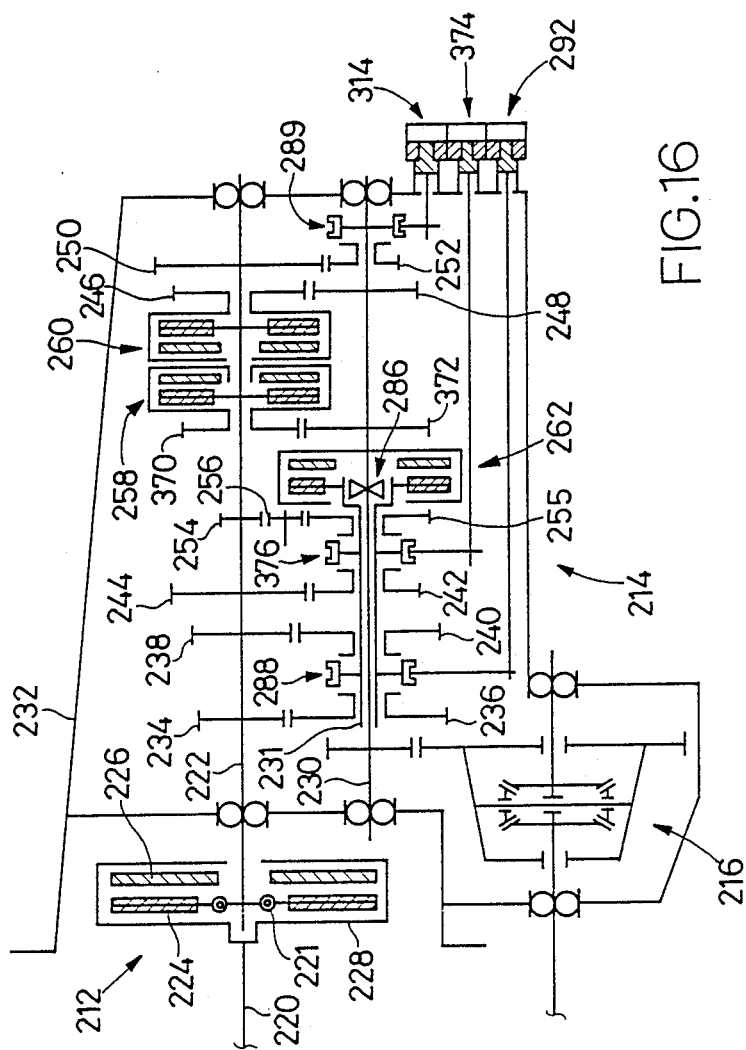

AUTOMATIC TRANSMISSION FOR AUTOMOTIVE VEHICLE

BACKGROUND OF THE INVENTION

1. Field of the Invention

The present invention relates in general to an automatic transmission for an automotive vehicle, and more particularly to a technique for simplified control of the transmission to effect shifting operations while preventing a shifting shock due to temporary disconnection of the transmission line.

2. Discussion of the Prior Art

As an automatic transmission for an automotive vehicle, there is known a hydraulically operated constant-mesh transmission which includes: an input shaft coupled to an engine of the vehicle via a primary clutch; an output shaft connected to drive wheels of the vehicle; a plurality of pairs of gears for transmitting power from the input shaft to the output shaft at different speed reduction ratios; a hydraulically operated actuator device for activating shift members to select one of the pairs of gears. In this automatic transmission, power produced by the engine is transmitted to the drive wheels at the speed reduction ratio which corresponds to the pair of transmission gears automatically selected by the appropriate shift member. Namely, the transmission system indicated above utilizes a conventional manually operated constant-mesh transmission, and a hydraulic shift mechanism for automatically controlling the constant-mesh transmission. This type of transmission permits high fuel economy of the engine, owing to the use of the constant-mesh transmission.

An automatic shifting operation in the transmission system of the type indicated above is effected in a predetermined sequence of operation similar to a sequence of manual shifting operation usually employed by the vehicle driver for a manually operated transmission. More specifically described, when the transmission is shifted from one position to another, the engine output is temporarily lowered by reducing a fuel supply to the engine, and at the same time the primary clutch is disengaged for disconnecting the input shaft of the transmission from the engine. Then, the hydraulic actuator is operated to move the appropriate pair of transmission gears into position. Subsequently, the primary clutch is restored to the engaged position. Since the primary clutch is temporarily disengaged, the transmission of power from the engine to the drive wheels is interrupted for the corresponding period. This interruption gives the vehicle driver an unpleasant shifting feel. The shifting feel is deteriorated, particularly when the transmission is shifted between low-gear positions, for example, upon a shift-up action from the first-speed to the second-speed position, or from the second-speed to the third-speed position, or upon a shift-down action from the second-speed or third-speed position to the first-speed or second-speed position. In these low-gear positions, there exists a relatively large difference in the drive torque between the input and output shafts of the transmission, and consequently the interruption of the power transmission causes a shifting shock.

To minimize such a shifting shock due to the temporary disengagement of the primary clutch upon shifting of the transmission, it is proposed to use a secondary clutch as disclosed in British Patent Specification GB-A-8,203,394 (U.S. Pat. No. 4,544,057) wherein outer and inner input shafts of the transmission are connected to the engine by means of the primary and secondary clutches, such that the primary and secondary clutches are disposed between the engine and the output shaft, in parallel with each other. While the primary clutch is temporarily disengaged to allow for a shifting operation of the transmission, the secondary clutch is placed in partially engaged position, in order to transmit a rotary motion of the engine to the drive wheels, and thereby avoid the complete disconnection of the engine from the drive wheels even during the shifting action of the transmission.

In such a conventional transmission using the parallel primary and secondary clutches, the secondary clutch must be partially engaged at the moment when the primary clutch is disengaged upon a shifting operation of the transmission. This requires a complicated control arrangement for intricate timing control of the disengaging and engaging actions of the primary and secondary clutches. If the engaging action of the secondary clutch takes place too early relative to the disengagement of the primary clutch, the transmission is brought to a locked state, causing a considerable amount of shifting shock. If the secondary clutch is engaged too late, the engine is subject to a racing phenomenon due to a sudden drop of the engine load after the disengagement of the primary clutch. The exact control of the disengaging and engaging actions of the two clutches has been considered difficult.

SUMMARY OF THE INVENTION

It is accordingly an object of the present invention to provide an automatic transmission for an automotive vehicle, which permits simple shifting operations while preventing a shifting shock due to temporary disconnection of the transmission line.

The above object of the invention may be achieved according to the principle of the present invention, which provides an automatic transmission for an automotive vehicle, including an input shaft connected to an engine of the vehicle via a primary clutch, an output shaft parallel to the input shaft and operatively connected to drive wheels of the vehicle, a plurality of pairs of gears for transmitting a drive force of the input shaft to the output shaft at different speed reduction ratios, respectively, at least one shift member for selecting one of the pairs of gears into an operative position, and an actuator device for automatically activating the at least one shift member, comprising: (a) a secondary clutch connected to the primary clutch by the input shaft, and disposed between the input and output shafts; (b) an intermediate shaft disposed in a transmission line between the input and output shafts, the intermediate shaft being provided with one of the gears of each of at least one of the pairs of gears; and (c) a one-way clutch disposed between the intermediate shaft and one of the input and output shafts, the one-way clutch permitting power to be transmitted only in a direction from the input shaft toward the output shaft.

In the automatic transmission of the present invention constructed as described above, the secondary clutch disposed between the input and output shafts is disposed in series with the primary clutch. When the transmission is shifted from one position corresponding to one of the pairs of gears, to another position corresponding to another pair of gears, the secondary clutch is temporarily placed in a partially engaged state while the primary clutch is held fully engaged. In this condition during a shifting operation of the transmission, the vehicle is driven by the power transmitted by means of the partial engagement of the secondary clutch. Accordingly, a reduction in the accelerating feel of the vehicle due to a shift-up action, for example, may be minimized. Further, the newly selected pair of gears may be smoothly placed into the operative position when the engine speed has been lowered, due to the partial engagement of the secondary clutch, to a level at which the one-way clutch begins to slip. Since the primary and secondary clutches are held in the fully engaged and partially engaged positions, respectively, the instant arrangement does not require an intricate control of timing of engaging and disengaging actions of the two clutches, and is therefore free from a shifting shock or a racing of the engine due to inadequate control of the clutches. The elimination of the intricate control indicated above makes it possible to use a relatively simple control system for controlling the shifting operations of the transmission.

According to one feature of the present invention, wherein the intermediate shaft comprises a sleeve disposed concentrically with and radially outwardly of the output shaft. In this case, one of the gears of the above-indicated at least one pair of gears is provided on the intermediate shaft, while the other gear is provided on the input shaft. In one form of the present arrangement, the secondary clutch is disposed between one end of the input shaft remote from the engine, and corresponding one end of the output shaft.

According to another feature of the invention, the input and output shafts are disposed in line with each other parallel to axes of rotation thereof, and the intermediate shaft includes a sleeve disposed fitting on the output shaft, in concentric relation with each other. In this instance, the automatic transmission further includes a countershaft which is disposed in parallel to the input and output shafts and operatively connected to the input shaft. One of the gears of each of the above-indicated at least one pair of gears is provided on the intermediate shaft while the other gear is provided on the countershaft. Preferably, the secondary clutch is disposed between one end of the input shaft remote from the engine, and one end of the output shaft adjacent to the one end of the input shaft.

According to a further feature of the invention, the primary clutch incorporates a damper for absorbing a shock.

According to a still further feature of the invention, the transmission further includes an engine-brake clutch disposed in parallel to the one-way clutch. The engine-brake clutch is engaged to permit power to be transmitted from the output shaft to the input shaft, thereby permitting an engine brake to be applied to the vehicle. In this case, the one-way clutch may be disposed within a casing of the engine-brake clutch.

In accordance with a still further feature of the invention, the actuator device is a hydraulically operated actuator.

According to another feature of the invention, the above-indicated at least one shift member includes at least one synchromesh device for synchronizing the output shaft with the selected one of the pairs of gears.

According to another aspect of the invention, a controller may be provided to control the actuator device, the primary and secondary clutches, and the engine-brake clutch. The controller is adapted to operate the actuator device to place the selected one of the pairs of gears in the operative position while holding the primary clutch in a fully engaged position thereof and the secondary clutch in a partially engaged position. Where the one-way clutch is provided, the controller activates the engine-brake clutch to apply the engine brake to the vehicle, depending upon running conditions of the vehicle.

According to a further aspect of the present invention, there is provided an automatic transmission for an automotive vehicle, including an input shaft connected to an engine of the vehicle via a primary clutch, an output shaft parallel to the input shaft and operatively connected to drive wheels of the vehicle, a plurality of pairs of gears for transmitting a drive force of the input shaft to the output shaft at different speed reduction ratios, respectively, at least one shift member for selecting one of the pairs of gears into an operative position, and an actuator device for automatically activating the at least one shift member, the plurality of pairs of gears including a first pair of gears, a second pair of gears, a third pair of gears and a fourth pair of gears, comprising: (a) an intermediate shaft disposed in a transmission line between the input and output shafts, the intermediate shaft being provided with one of the first pair of gears, and one of the second pair of gears; (b) a first secondary clutch and a second secondary clutch which are connected to the primary clutch by the input shaft, and are disposed in parallel to each other between the input and output shafts, for connecting the input shaft to the output shaft through the third and fourth pairs of gears, respectively, the first and second secondary clutches being selectively placed in a partially engaged position when the first and second pairs of gears are brought into the operative position; and (c) a one-way clutch disposed between the intermediate shaft and one of the input and output shafts, the one-way clutch permitting power to be transmitted only in a direction from the input shaft toward the output shaft.

In the above automatic transmission also constructed according to the present invention, the first and second secondary clutches disposed between the input and output shafts are disposed in series with the primary clutch. When the transmission is shifted from one position to another, the first or second secondary clutch is temporarily placed in a partially engaged state while the primary clutch is held fully engaged. In this condition during a shifting operation of the transmission, the vehicle is driven by the power transmitted by means of the partial engagement of one of the two secondary clutches. Accordingly, a reduction in the accelerating feel of the vehicle due to a shift-up action, for example, may be minimized. Further, the transmission may be smoothly placed in the position corresponding to the newly selected pair of gears, when the engine speed has been lowered, due to the partial engagement of the first or second secondary clutch, to a level at which the one-way clutch begins to slip. Since the primary clutch and the first or second secondary clutch are held in the fully engaged and partially engaged positions, respectively, the instant arrangement does not require an intricate control of timing of engaging and disengaging actions of the two clutches. Therefore, the instant transmission may be relatively easily controlled without a shiting shock and/or a racing of the engine due to inadequate control of the two clutches.

Further, the first and second secondary clutches which are partially engaged for bringing the first and second pairs of gears into the operative position, respectively, are used to transmit the drive force of the input shaft to the output shaft through the third and fourth pairs of gears, respectively, which have different speed reduction ratios. The present arrangement assures a reduced variation in the output torque of the transmission during a shifting operation between the positions corresponding to the first and second pairs of gears. Since the first and second secondary clutches are selectively used depending upon the newly established position corresponding to one of the first and second pairs of gears, the durability of these secondary clutches may be improved.

According to one feature of the above aspect of the invention, the transmission is placed in a first-speed position, a second-speed position, a third-speed position and a fourth-speed position when the first, second, third and fourth pairs of gears are placed in the operative position, respectively. In this case, the first and second secondary clutches are fully engaged when the third-speed and fourth-speed positions are selected, respectively.

According to another feature of the same aspect of the invention, the intermediate shaft comprises a sleeve which is disposed concentrically with and radially outwardly of the output shaft, and the one-way clutch is disposed between the intermediate shaft and the output shaft.

According to a further feature of the invention, the automatic transmission further comprises a controller for controlling the actuator device, the primary clutch, and the first and second secondary clutches, the control means operating the actuator device to place one of the first and second pairs of gears in the operative position while holding corresponding one of the first and second secondary clutches in a partially engaged position, and holding the primary clutch in a fully engaged position.

In one form of the above feature of the invention, the transmission further comprises an engine-brake clutch disposed in parallel with the one-way clutch, between the intermediate shaft and the output shafts, to permit an engine brake to be applied to the vehicle. In this case, the controller is adapted to activate the engine-brake clutch, depending upon running conditions of the vehicle.

BRIEF DESCRIPTION OF THE DRAWINGS

The above and other objects, features and advantages of the present invention will become more apparent by reading the following detailed description of preferred embodiments of the invention, when considered in connection with the accompanying drawings, in which:

FIGS. 3 and 4 are flow charts illustrating shift-up and shift-down operations of the transmission, respectively;

FIG. 16 is a schematic view showing a modification of the automatic transmission of FIG. 8.

DETAILED DESCRIPTION OF THE PREFERRED EMBODIMENTS

Figure 1:
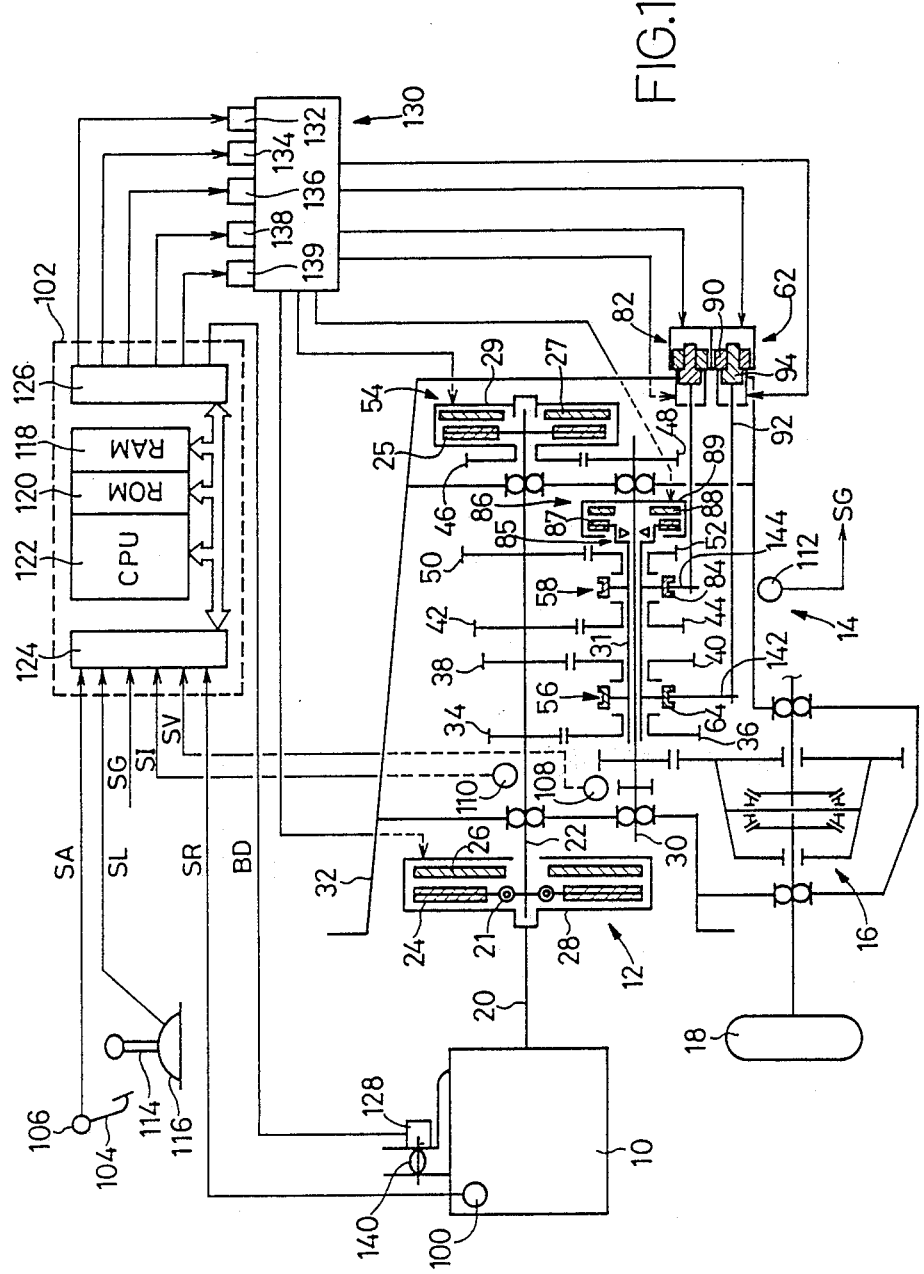
FIG. 1 is a schematic view showing a power transmitting system for an automotive vehicle, including one embodiment of an automatic transmission of the invention.

Referring first to FIG. 1, there is shown a power transmitting system for an automotive vehicle wherein power produced by an engine 10 is transmitted to drive wheels 18 of the vehicle, via a first clutch 12, a constant-mesh transmission 14, and a differential gear device 16. The constant-mesh transmission 14 is of a parallel two-shaft type which has synchromesh devices (which will be described), and a plurality of speed reduction ratios.

The first clutch 12, constant-mesh transmission 14, and a controller 102 constitute a major part of the instant embodiment of an automatic transmission system of the present invention.

The first clutch 12, which is hydraulically operated, is disposed between a crankshaft 20 of the engine 10, and an input shaft 22 of the transmission 14. The clutch 12 has a clutch casing 28 which accommodates a rotor 24 connected to the input shaft 22 via a damper 21. Also accommodated in the casing 28 is a hydraulically operated piston 26 which is adapted to force the rotor 24 for connection of the crankshaft 20 and the input shaft 22.

The constant-mesh transmission 14 has a speed shifting mechanism constructed similarly to an ordinary manually-shifted constant-mesh transmission as used for a front-engine front-drive (FF) vehicle wherein the engine is oriented transversely of the vehicle. The input shaft 22, and an output shaft 30 are disposed within a housing 32, such that the input and output shafts 22, 30 are parallel to each other. The transmission 14 further includes an intermediate shaft 31 in the form of a sleeve through which the output shaft 30 extends such that the two shafts 30, 31 are rotatable relative to each other. Between the input and output shafts 22, 30, and between the input and intermediate shafts 22, 31, there are provided a plurality of pairs of gears, that is, a first-speed pair, a second-speed pair, a third-speed pair and a fifth-speed pair which are disposed between the input and intermediate shafts 22, 31, and a fourth-speed pair disposed between the input and output shafts 22, 30. Another pair of gears (not shown) are provided between the input and output shafts 22, 30, for reverse drive of the vehicle.

Described more specifically, the first-speed pair consists of a first stationary gear 34 fixed to the input shaft 22, and a first rotatable gear 36 which meshes with the first stationary gear 34 and which is rotatably supported on the intermediate shaft 31 such that the rotatable gear 36 can freely spin relative to the shaft 31. The second-speed pair consists of a second stationary gear 38 fixed to the input shaft 22, and a second rotatable gear 40 which meshes with the second stationary gear 38 and which is rotatably supported on the intermediate shaft 31, like the first rotatable gear 36. The third-speed pair consists of a third stationary gear 42 fixed to the input shaft 22, and a third rotatable gear 44 meshing with the third stationary gear 42 and rotatably supported on the intermediate shaft 31. The fourth-speed pair consists of a fourth rotatable gear 46 supported on the input shaft 22 such that the gear 46 is connected and disconnected to the input shaft 22 by means of a second clutch 54, and a fourth stationary gear 48 fixed to the output shaft 30. The fifth-speed pair consists of a fifth stationary gear 50 fixed to the input shaft 22, and a fifth rotatable gear 52 which meshes with the fifth stationary gear 50 and which is rotatably supported on the intermediate shaft 31 such that the rotatable gear 52 can freely spin on the intermediate shaft 31. As indicated above, the second clutch 54 is provided in series with the first clutch 12, and is disposed in a power transmission line including the fourth-speed pair of gears 46, 48. The second clutch 54 includes a rotor 25 connected to the input shaft 22, a hydraulically operated piston 27 for forcing the rotor 25 for connection of the input and output shafts 22, 30, and a clutch casing 29 which accommodates the rotor 25 and the piston 27. The casing 29 is secured to the fourth rotatable gear 46 and is rotatable relative to the input shaft 22.

The intermediate shaft 31 is provided with a first synchromesh device 56 for selectively connecting one of the first and second rotatable gears 36, 40 to the intermediate shaft 31 so that the selected one of the gears 36, 40 is rotated with the intermediate shaft 31. The intermediate shaft 31 is also provided with a second synchromesh device 58 for selectively connecting one of the third and fifth rotatable gears 44, 52 to the intermediate shaft 31.

Figure 2:
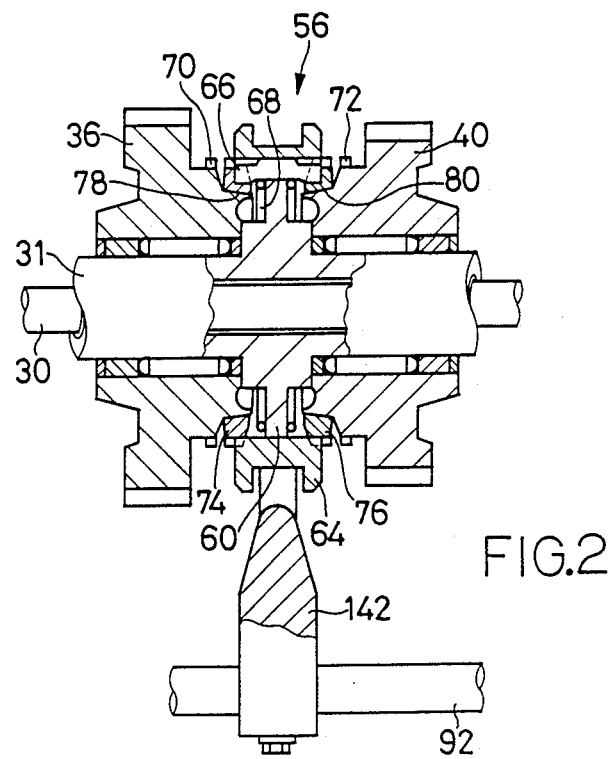
FIG. 2 is an elevational view in cross section of a synchromesh device incorporated in the automatic transmission of FIG. 1.

As shown in FIG. 2, the first synchromesh device 56 includes: a hub 60 secured to the intermediate shaft 31; a first sleeve 64 which is splined to the hub 60 an axially moved by a first hydraulic cylinder 62; a key 66 provided on the inner circumferential surface of the first sleeve 64 so that the key 66 is moved with the sleeve 64; a spring 68 for biasing the key 66 in the radially outward direction of the sleeve 64; externally toothed portions 70, 72 formed on the outer circumferential surfaces of the first and second rotatable gears 36, 40, respectively; and a pair of synchronizer rings 74, 76 disposed between the the first sleeve 64, and the first and second rotatable gears 36, 40, respectively. When the first sleeve 64 is moved by the first cylinder 62 toward the first rotatable gear 36, the synchronizer ring 74 is forced by the first rotatable gear 36 via the key 66. Consequently, the rotation of the first rotatable gear 36 is synchronized with the rotation of the hub 60 by means of frictional engagement of coned friction surfaces 78 formed on the first rotatable gear 36 and the synchronizer ring 74. Upon synchronization of the gear 36 and the hub 60, the first sleeve 64 is permitted to be further moved, whereby the internally toothed portion of the first sleeve 64 is brought into engagement with the externally toothed portion 70 of the first rotatable gear 36. Thus, the transmission 14 is placed in its first-speed position. When the first sleeve 64 is moved toward the second rotatable gear 40, on the other hand, the synchronizer ring 76 engages the friction surface 80 and the sleeve 64 is brought into engagement with the externally toothed portion 72 of the second rotatable gear 40, whereby the transmission 14 is placed in its second-speed position.

The second synchromesh device 58 is identical in construction with the first synchromesh device 56. This synchromesh device 58 includes a second sleeve 84 which is splined to a hub secured to the intermediate shaft 31. The second sleeve 84 is axially moved by a second hydraulic cylinder 82. When the second sleeve 84 is engaged with the third rotatable gear 44, the transmission 14 is placed in its third-speed position. The fifth-speed position is established when the second sleeve 84 is engaged with the fifth rotatable gear 52.

Between the output shaft 30 and the intermediate shaft 31 of the transmission 14, there are provided a one-way clutch 85 and an engine-brake clutch 86. The one-way clutch 85 is adapted to transmit power only in one direction from the intermediate shaft 31 toward the output shaft 30. The engine-brake clutch 86, which is disposed in parallel with the one-way clutch 85, includes a rotor 87 fixed to the intermediate shaft 31, a piston 88, and a clutch casing 89 secured to the output shaft 30. The rotor 87 and the piston 88 are accommodated in the casing 89.

The engine 10 is provided with an engine-speed sensor 100, which generates an ENGINE-SPEED signal SR indicative of an operating speed Ne of the engine. The signal SR is applied to a controller 102. Further, an accelerator pedal 104 of the vehicle is provided with an acceleration sensor 106, which generates an ACCELERATION signal SA indicative of an operating amount Acc of the accelerator pedal. This signal SA is also applied to the controller 102. Adjacent to the output shaft 30 of the constant-mesh transmission 14, there is disposed a vehicle-speed sensor 108, which generates a VEHICLE-SPEED signal SV indicative of a rotating speed of the output shaft 30 that corresponds to a running speed V of the vehicle. Adjacent to the input shaft 22 of the transmission 14, there is disposed an input-shaft sensor 110, which generates an INPUT-SPEED signal SI indicative of a rotating speed Ni of the input shaft 22. These signals SV and SI are also fed to the controller 102. The controller 102 also receives a GEAR-POSITION signal SG generated by a gear-position sensor 112 disposed near the transmission 14, and a SHIFT-POSITION signal SL generated from a shift-position sensor 116 provided on a shift lever 114. The GEAR-POSITION signal SG represents the currently selected position of the transmission 14, while the SHIFT-POSITION signal SL represents the currently selected shift position of the shift lever 114.

The controller 102 is constituted by a microcomputer which includes a random-access memory (RAM) 118, a read-only memory (ROM) 120, a central processing unit (CPU) 122, an input interface 124, and an output interface 126. The CPU 122 processes the input signals indicated above, according to a control program stored in the ROM 120, while utilizing a temporary data storage function of the RAM 118, and generates a DRIVE signal BD for controlling a throttle actuator 128 provided on the engine 10, and various drive signals for controlling solenoid valves 132, 134, 136, 138 and 139 of a hydraulic control circuit 130 for activating the first and second clutches 12, 54, first and second hydraulic cylinders 62, 82, and engine-brake clutch 86. The hydraulic control circuit 130 includes a hydraulic pump (not shown) driven by the engine 10, for example, for supplying a pressurized fluid of a controlled pressure to the first and second clutches 12, 54, first and second hydraulic cylinders 62, 82 and engine-brake clutch 86, according to the operations of the solenoid valves 132, 134, 136, 138, 139.

Each of the first and second cylinders 62, 82 has a large-diameter piston 90 slidably fitted in a large-diameter portion of a stepped cylinder bore, and a small-diameter piston 94 slidably fitted in a small-diameter portion of the stepped cylinder bore. The small-diameter piston 94 is connected to a piston rod 92. With a pressurized fluid supplied to the large-diameter portion of the cylinder bore, the piston rod 92 is fully advanced. The rod 92 is moved to its fully retracted position when the fluid is supplied to the small-diameter portion of the cylinder bore. When the fluid is supplied to the large-diameter and small-diameter portions, the rod 92 is placed in its neutral position. The piston rod 92 of the first cylinder 62 is connected to a shift fork 142, while the piston rod 92 of the second cylinder 82 is connected to a shift fork 144. In the above arrangement, the first cylinder 62 is operated to move the first sleeve 64 of the first synchromesh device 56 through the shift fork 142, to one of three positions, i.e., neutral position, first-speed position (on the side of the first rotatable gear 36) and second-speed position (on the side of the second rotatable gear 40). Similarly, the second cylinder 82 is operated to move the second sleeve 84 of the second synchromesh device 58 through the shift fork 144, to one of three positions, i.e., neutral position, third-speed position and fifth-speed position.

In an intake manifold of the engine 10, there is disposed a throttle valve 140 which is activated by the throttle actuator 128 indicated above. Normally, the throttle valve 140 is controlled in response to the DRIVE signal BD from the controller 102, so that the throttle opening corresponds to the operating amount Acc of the accelerator pedal 104. The solenoid valves 132, 134 are adapted to supply the pressurized fluid to the first and second hydraulic cylinders 62, 82, so as to establish the appropriate gear position of the transmission 14. The solenoid valves 136, 138 are adapted to supply the fluid to the first and second clutches, for activating the pistons 26, 27 for frictional engaging actions of the clutches. The solenoid valve 139 is adapted to supply the fluid to the engine-brake clutch 86, for activating the piston 88.

There will be described an operation of the present embodiment of the invention.

The CPU 122 of the controller 102 selects one of control modes according to the status of the vehicle, to control the power transmitting system. The control modes includes a start mode while the vehicle is started, a neutral mode while the constant-mesh transmission 14 is placed in its neutral position, a shift mode while the transmission 14 is shifted, and an engine-brake mode while the vehicle is running with an engine brake applied. When the shift mode is selected while the vehicle is running, the CPU 122 commands the solenoid valve 136 so as to hold the first clutch 12 in the engaged position. In this shift mode, the CPU 122 selects one of a plurality of shift patterns (shift diagrams) stored in the ROM 120, based on the currently selected position of the transmission 14, and generates shifting commands to obtain an optimum position of the transmission 14, based on the detected vehicle speed V and the detected operating amount Acc of the accelerator pedal 104, and according to the selected shift pattern. When the CPU 122 determines to shift the transmission 14 from the currently selected position to another, this shifting is automatically effected in a predetermined sequence. For example, if the CPU 122 generates a shift-up command while the transmission 14 is placed in its first-speed or second-speed position, the transmission 14 is automatically shifted up to the second-speed position or third-speed position, in a sequence as illustrated in FIG. 3. If the CPU 122 generates a shift-down command while the transmission 14 is placed in its second-speed or third-speed position, the transmission 14 is automatically shifted down to the first-speed position or second-speed position, in a sequence as illustrated in FIG. 4. While the above shift-up or shift-down operation is performed, the opening of the throttle valve 140 is kept constant, and the first clutch 12 is held in its engaged position.

When the transmission 14 is shifted up from the first-speed position to the second-speed position, step SU1 of FIG. 3 is initially executed, to commence a supply of the pressurized fluid to the second clutch 54 (which has been kept in its disengaged position). The commencement of the fluid supply to the second clutch 54 is indicated at "A" in FIG. 5. As the fluid pressure acting on the piston 27 of the second clutch 54 is increased, the clutch 54 is partially engaged, and the output torque of the transmission 14 is reduced. Then the engine speed Ne begins to be lowered, since the load exerted on the engine 10 is increased. This point of time is indicated at "B" in FIG. 5. In step SU2, the CPU 122 checks if whether or not a rate of change (dNe/dt) of the engine speed Ne is smaller than a predetermined value $-\alpha$, in order to determine the point "B" at which the engine speed Ne begins to be lowered. When the CPU 122 has detected the point "B" in step SU2, the CPU 122 goes to step SU3 in which the solenoid valve 132 is commanded to control the first hydraulic cylinder 62 so that the first sleeve 64 of the first synchromesh device 56 is placed in its neutral position. In the next step SU4, the hydraulic pressure acting on the piston 27 of the second clutch 54 is maintained to hold the partial engagement of the clutch 54. As a result, the engine speed Ne is continuously lowered. During this period, the output torque of the transmission 14 is slightly increased due to an inertia energy of the engine 10.

Step SU4 is followed by step SU5 in which the CPU 122 selects a target engine speed N1* from among a plurality of target values stored in the ROM 120, depending upon the first-speed position of the transmission 14. Then, the CPU 122 determines whether or not the actual engine speed Ne has been lowered down to the selected target speed N1*. This target value N1* is determined such that the value N1* is slightly lower than an engine speed N2 which is obtained in the newly selected position of the transmission 14, i.e., when the transmission 14 is shifted up to the second-speed position, in this specific case. For instance, the ROM 120 stores a predetermined formula for calculating an engine speed Ne which is to be established when the transmission 14 is shifted from one position to another, and the CPU 122 calculates a target value of the engine speed Ne, based on the currently selected position of the transmission 14 and the current speed of the vehicle, and according to the stored formula.

When the CPU 122 determines in step SU5 that the actual engine speed Ne has been lowered to the target engine speed N1*, step SU6 is executed to operate the first hydraulic cylinder 62 for biasing or forcing the first sleeve 64 toward the second-speed position on the side of the second rotatable gear 40. This point of time is indicated at "C" in FIG. 5. Consequently, the intermediate shaft 31 is synchronized with the second rotatable gear 40 by the first synchromesh device 56. This synchronization between the intermediate shaft 31 and the second rotatable gear 40 is facilitated by the one-way clutch 85, since the actual engine speed Ne i.e., target seed N1*, is held lower than the speed N2 of the second-speed portion and the engine torque is transmitted to the output shaft 30 through the fourth-speed gears 46, 48. Namely, the synchronization is effected under substantially non-load condition of the shaft 31, i.e., with the shaft 31 disconnected from the output shaft 30 by the one-way clutch 85. Therefore, the first sleeve 64 of the first synchromesh device 56 can be smoothly shifted from the neutral position to the second-speed position in which the intermediate shaft 31 is rotated with the second rotatable gear 40. Thus, the transmission 14 is shifted up to the second-speed position.

Figure 5:
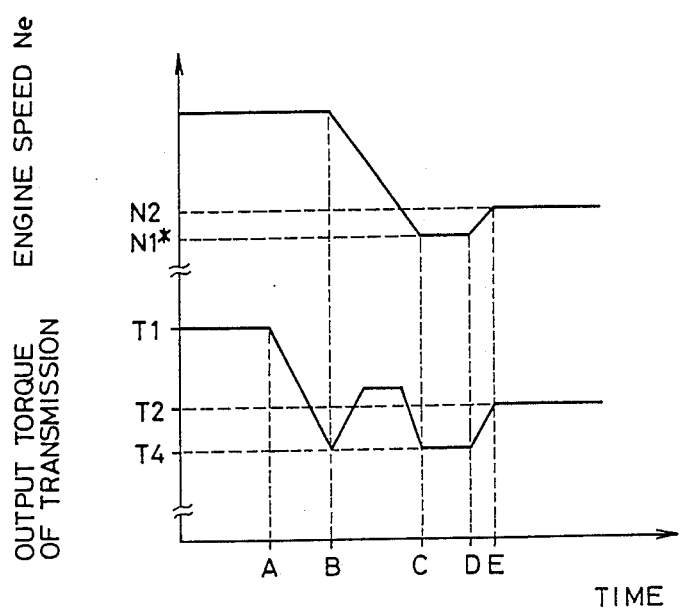
FIGS. 5 and 6 are graphs indicating changes in the operating speed of the engine of the vehicle, and the output torque of the transmission, during the shift-up and shift-down operations, respectively.

The CPU 122 then goes to step SU7 to check if the transmission 14 has been shifted up to the second-speed position with the first sleeve 64 fully engaged with the second rotatable gear 40. If an affirmative decision is obtained, step SU7 is followed by step SU8 wherein the hydraulic pressure which has been acting on the second clutch 54 is released. In consequence, the actual engine speed Ne begins to rise as indicated at "D" in FIG. 5, and the torque transmitted by the second clutch 54 begins to be reduced. When the transmission torque of the second clutch 54 has been reduced to zero as indicated at "E" in FIG. 5, the output of the engine 10 is transmitted to the output shaft 30, solely through a transmission line which includes the second-speed pair of gears 38, 40, first synchromesh device 56 and one-way clutch 85. Therefore, the engine speed Ne is changed to a level N2 corresponding to the second-speed position of the transmission 14, and the output torque of the transmission 14 is held at a level T2 as indicated in FIG. 5. It is noted that the operating time between the points "A" and "E" of FIG. 5 is approximately 0.4 second. In the figure, "T1" represents the output torque of the transmission 14 when the transmission is placed in its first-speed position, an "T4" represents the output torque when the transmission 14 is placed in its fourth-speed position with the second clutch 54 being held in partially engaged position.

As is apparent from the above description, the transmission of power from the engine 10 to the drive wheels 18 will not be interrupted even while the transmission 14 is in a shift-up action, from the first-speed or second-speed position. Accordingly, the shift-up action to the second-speed or third-speed position of the transmission 14 can be achieved in a smooth manner without a shifting shock.

Since the illustrated embodiment is adapted to accomplish a shifting operation of the transmission 14 by increasing the partial engagement of the second clutch 54 while holding the first clutch 12 in the fully engaged position, the shifting operation does not require such an intricate timing control of disengaging and engaging actions of the clutches, as required for parallel primary and secondary clutches in the conventional arrangement referred to in the introductory part of the present application. Hence, the present embodiment does not suffer from a shifting shock and a racing of the engine 10, due to inadequate timing control of the two clutches, and the control system for the power transmitting system can be significantly simplified.

Figure 6:
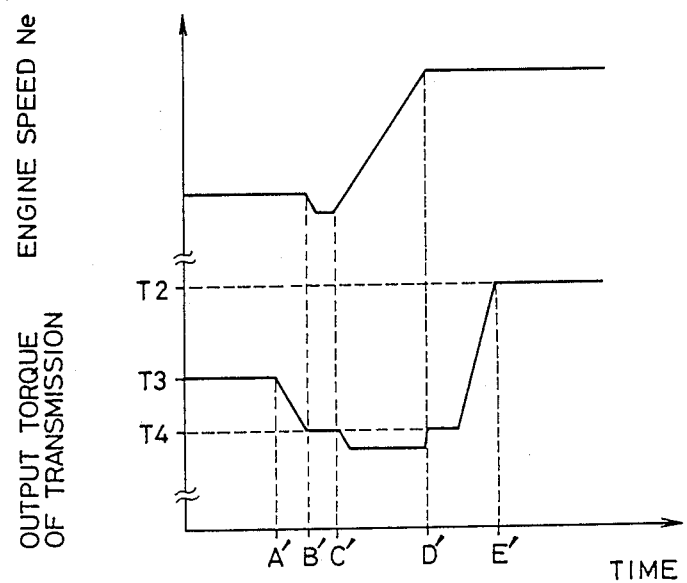

Referring next to FIG. 4, a shift-down operation of the transmission 14 will be described. In an example shown in this figure, the transmission 14 is commanded to be shifted down to the second-speed position while the vehicle is running in the third-speed position. Initially, step SD1 is implemented to apply the pressurized fluid to the piston 27 of the second clutch 54 which has been held disengaged. This point of time is indicated at "A" in FIG. 6. As a result, the power produced by the engine 10 is transmitted to the partially engaged second clutch 54, and the power transmitted by the second synchromesh device 58 begins to be reduced. At the same time, the engine speed Ne begins to be lowered, since the load exerted on the engine 10 is increased. This point of time is indicated at "B" in FIG. 6.

In step SD2, the CPU 122 checks if whether or not a rate of change (dNe/dt) of the engine speed Ne is smaller than a predetermined value $-\beta$, in order to determine the point "B'" at which the engine speed Ne begins to be lowered. When the CPU 122 has detected the point "B'" in step SD2, the CPU 122 goes to step SD3 in which the solenoid valve 134 is commanded to control the second hydraulic cylinder 82 so that the second sleeve 84 of the second synchromesh device 58 is placed in its neutral position. As described above, the engine speed Ne has been lowered from the third-speed level, and the second synchromesh device 58 is freed by the one-way clutch 85. Accordingly, no load is applied to the second synchromesh device 58, and consequently the second sleeve 84 can be smoothly moved to its neutral position. Then, step SD4 is executed to reduce the hydraulic pressure acting on the piston 27 of the second clutch 54. Further, the solenoid valve 132 is commanded to supply the pressurized fluid to the first hydraulic cylinder 62, for moving the first sleeve 64 of the first synchromesh device 54 from the neutral position to the second-speed position on the side of the second rotatable gear 40. This point of time is indicated at "C'" in FIG. 6.

As the partial engagement of the second clutch 54 is reduced, the load exerted on the engine 10 is decreased, whereby the engine speed Ne rises up to the second-speed level. At this point of time indicated at "D'" in FIG. 6, the first sleeve 64 of the first synchromesh device 54 is moved to its second-speed position in which the intermediate shaft 31 is rotated with the second rotatable gear 40. When this state is detected in step SD5, the CPU 122 goes to step SD6 to release the hydraulic pressure which has been acting on the second clutch 54, whereby the torque transmitted by the second clutch 54 is zeroed. As a result, the power from the engine 10 is transmitted solely through the second-speed pair of gears 38, 40 and the first synchromesh device 56. Accordingly, the output torque of the transmission 14 is increased to a level T2 as indicated at "E'" in FIG. 6. In the figure, "T3" represents the output torque of the transmission 14 when the transmission is placed in its third-speed position.

As in the shift-up operation previously discussed, the transmission of power from the engine 10 to the drive wheels 18 will not be interrupted while the transmission 14 is in a shift-down action from the second-speed or third-speed position, down to the first-speed or second-speed position. Further, the shift-down operation is also accomplished while the second clutch 54 is partially engaged, with the first clutch 12 held in the fully engaged position. Therefore, the power transmitting system can be readily controlled, without an intricate timing control of the clutches, and without causing a shifting shock or a racing of the engine 10.

A shifting of the transmission 14 from the third-speed position to the fourth-speed position is automatically effected under the control of the controller 102, by execution of steps similar to steps SU1, SU2 and SU3 of FIG. 3. In this case, the first synchromesh device 54 is not operated. Instead, the second clutch 54 is fully engaged. A shifting of the transmission 14 from the fourth-speed position down to the third-speed position is also automatically effected, by execution of steps similar to steps SD4, SD5 and SD6 of FIG. 4. In these shift-up and shift-down operations to and from the fourth-speed position, the present embodiment provides the same advantages as mentioned above.

Where the transmission 14 is shifted up from the fourth-speed position to the fifth-speed position, the controller 102 commands the throttle valve 140 to be fully closed for a given length of time while holding the second clutch 54 in its disengaged position, and commands the second synchromesh device 58 to move the second sleeve 84 for engagement with the fifth rotatable gear 52 when the actual engine speed Ne has been lowered to the target engine speed Ne*. A shift-down of the transmission 14 from the fifth-speed position down to the fourth-speed position is carried out in the reversed sequence. In these shift-up and shift-down operations between the fourth-speed and fifth-speed positions, the throttle valve 140 is temporarily placed in its fully closed position, and the drive torque is reduced. However, the temporary interruption of the power transmission at this time does not matter, since the drive force of the vehicle is small enough while the transmission 14 is shifted between the fourth-speed and fifth-speed positions, in which the speed reduction ratio is low.

The CPU 122 determines, based on parameters such as a gradient of the road surface, a running speed of the vehicle and an operating amount of the accelerator pedal 104, whether an engine brake must be applied to the vehicle or not. In the event of an affirmative determination, the CPU 122 commands the solenoid valve 139 to supply the pressurized fluid to the engine-brake clutch 86, for coupling the intermediate shaft 31 and the output shaft 30. As a result, the drive force of the drive wheels 18 can be transmitted to the engine 10, via the engaged engine-brake clutch 86, whereby an engine-brake is applied to the vehicle. Normally, the application of an engine brake is inhibited by the one-way clutch 85.

In the present embodiment of the automatic transmission described above, a shifting operation between two adjacent low-speed positions of the transmission 14 is achieved by moving the first or second synchromesh device 56, 58 toward the appropriate pair of gears while the second clutch 54 is in partially engaged position and while the first clutch 12 is held engaged. This arrangement eliminates difficult timing control of the disengaging and engaging actions of the parallel primary and secondary clutches used in the conventional arrangement. Thus, the instant arrangement does not suffer from a shock or a racing phenomenon of the engine 10, upon shifting of the transmission 14.

Further, the one-way clutch 85 inhibits the application of an engine brake, unless the engine-brake clutch 86 is engaged. This arrangement makes it possible to minimize the energy loss due to unnecessary application of an engine brake, and improve the fuel economy of the vehicle. Nevertheless, an engine brake can be applied when needed, by activating the engine-brake clutch 86 to its engaged position.

In the present embodiment, the second clutch 54 is provided so as to connect the input shaft 22 to the fourth-speed pair of gears 46, 48. This arrangement enables the second clutch 54 to provide a larger drive torque, and a smaller amount of slip and consequently improved durability, as compared with the conventional arrangement wherein the second clutch is provided in operative association with the fifth-speed gears.

Furthermore, the second clutch 54 of the present embodiment is disposed in series connection with the first clutch 12 via the input shaft 22. This arrangement does not require a complicated input shaft structure using two concentric members (outer sleeve and inner rod), as required in the conventional arrangement wherein the primary and secondary clutches are connected to the engine by the respective outer and inner concentric members, in parallel relation with each other.

In the conventional arrangement indicated just above, the fifth-speed position of the transmission is established by fully engaging the secondary clutch, and therefore the second clutch must also be provided with a suitable damper to absorb a shifting shock when the transmission is shifted to the fifth-speed position. The present embodiment, however, the second clutch 54 does not require such a damper, since it is directly connected to the first clutch 12 which has the damper 21.

Figure 7:
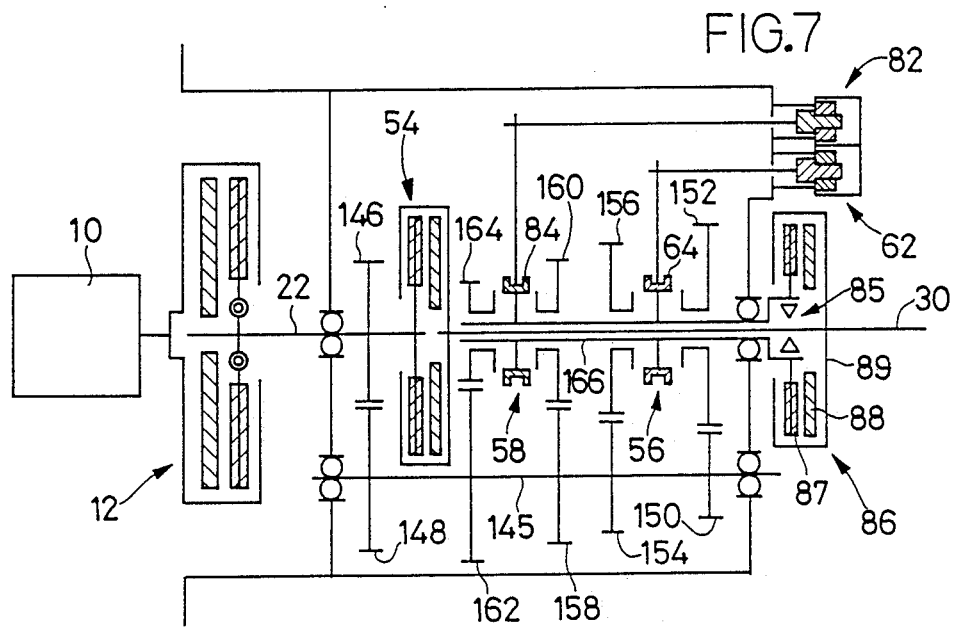
FIG. 7 is a schematic view showing a modification of the automatic transmission of FIG. 1.

Referring next to FIG. 7, a modified embodiment of the invention will be described. In the interest of brevity and simplification, the same reference numerals as used in FIG. 1 will be used to identify the corresponding elements, and redundant description of these elements will not be provided herein.

The transmission 14 shown in FIG. 7 is used for a front-engine rear-drive vehicle with the engine 10 oriented transversely of the vehicle. In the figure, the input shaft 22 is disposed in line with the output shaft 30 which extends through an outer intermediate shaft 166 in the form of a sleeve, such that the output shaft 30 and the tubular intermediate shaft 166 are rotatable relative to each other. The transmission 14 further includes a countershaft 145 parallel to the input and output shafts 22, 30. The input shaft 22 and the countershaft 145 are connected to each other by a pair of intermeshing gears 146, 148 respectively fixed thereto, so that the countershaft 145 is driven by the input shaft 22 such that they are rotated in the opposite directions. The second clutch 54 is disposed between the opposed ends of the input and output shafts 22, 30. With the second clutch 54 engaged, power is transmitted from the input shaft 22 to the output shaft 30, with a speed reduction ratio of 1. In other words, the transmission 14 is placed in the fourth-speed position.

Between the input shaft 22 and the output shaft 30, more precisely, between the countershaft 145 and the intermediate shaft 166, there are provided a plurality of pairs of power transmission gears, i.e., the first-speed pair, second-speed pair, third-speed pair and fifth speed pair.

The first-speed pair consists of a first stationary gear 150 fixed to the countershaft 145, and a first rotatable gear 152 which meshes with the first stationary gear 150 and which is rotatably supported on the intermediate shaft 166 such that the gear 152 can freely spin on the shaft 166. The second-speed pair consists of a second stationary gear 154 fixed to the countershaft 145, and a second rotatable gear 156 which meshes with the second stationary gear 154 and which is rotatably supported on the intermediate shaft 166. The third-speed pair consists of a third stationary gear 158 fixed to the countershaft 145, and a third rotatable gear 160 meshing with the gear 158 and rotatably supported on the intermediate shaft 166. The fifth-speed pair consists of a fifth stationary gear 162 fixed to the countershaft 145, and a fifth rotatable shaft 164 meshing with the gear 162 and rotatably supported on the intermediate shaft 166.

In the present modified embodiment, too, the first and second synchromesh devices 56, 58 are provided to establish the first-, second-, third- and fifth-speed positions of the transmission 14. More specifically, the first-speed position is established by engagement of the first sleeve 64 with the first rotatable gear 152. The second-speed position is established by engagement of the first sleeve 64 with the second rotatable gear 156. The third-speed position is established by engagement of the second sleeve 84 with the third rotatable gear 160, and the fifth-speed position is established by engagement of the second sleeve 84 with the fifth rotatable gear 164.

The present modified embodiment functions in the same manner as the preceding embodiment, and therefore provides the same advantages as described above.

Figure 8:
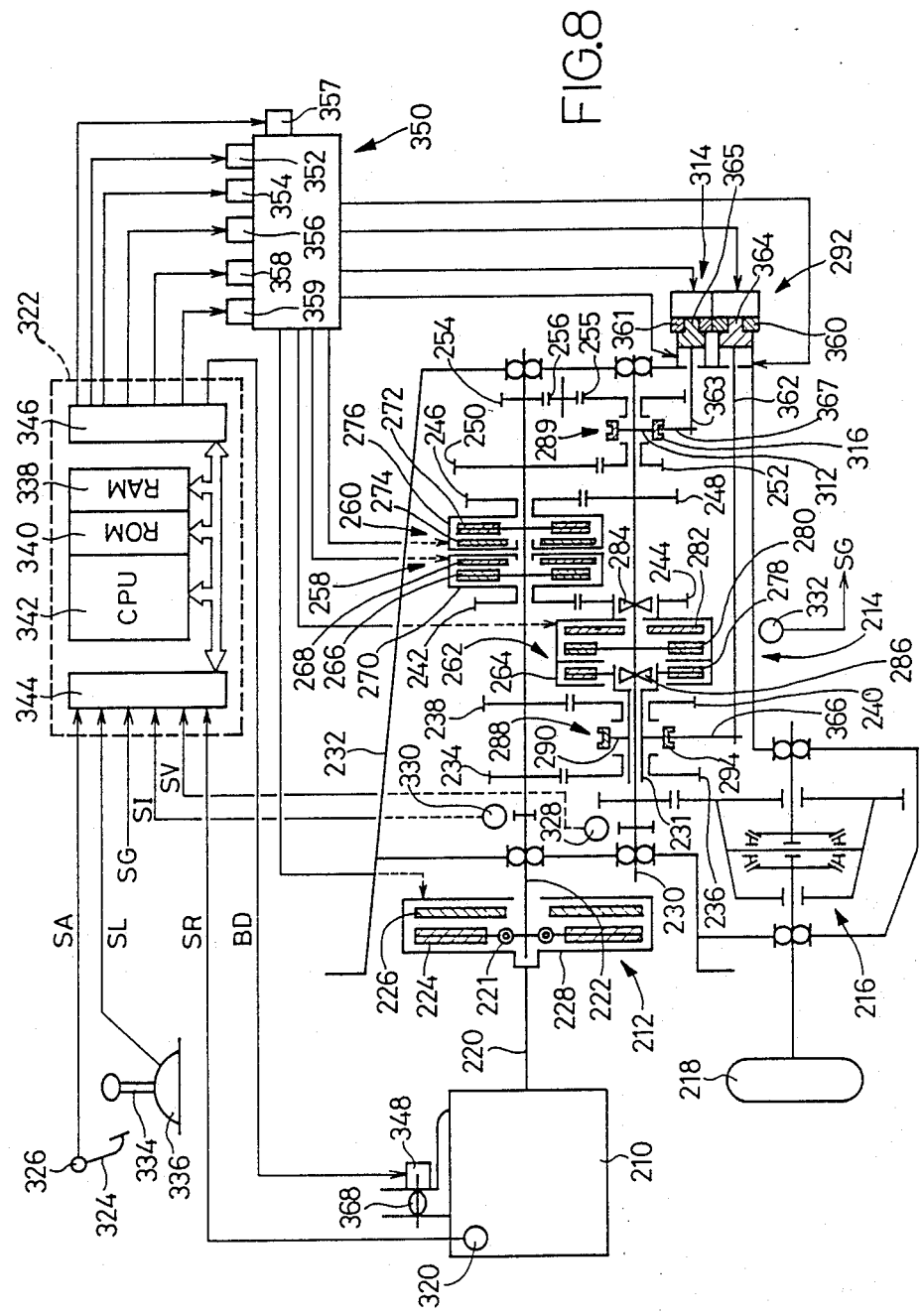
FIG. 8 is a schematic view showing a power transmitting system including another embodiment of an automatic transmission of the present invention.
Figure 9:
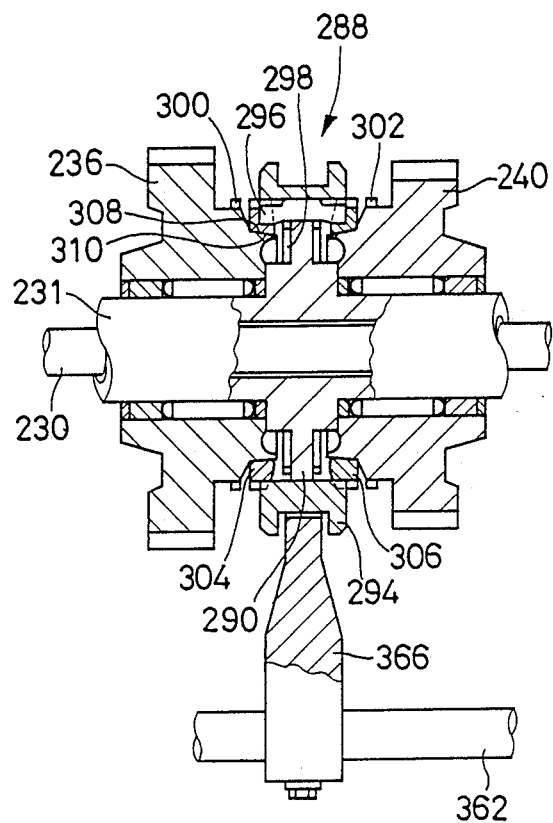
FIG. 9 is an elevational view in cross section of a synchromesh device used in the embodiment of FIG. 8.

Referring next to FIGS. 8 and 9, another embodiment of the present invention will be described.

In the power transmitting system illustrated in FIG. 8, an engine 210 is operatively connected to drive wheels 218 of the vehicle, via a first clutch 212, a constant-mesh transmission 214 of parallel two-shaft type, and a differential gear device 216. The first clutch 212, constant-mesh transmission 214, and a controller 322 (which will be described) constitute a major part of the instant embodiment of an automatic transmission system of the present invention.

The first clutch 212 is disposed between a crankshaft 220 of the engine 210, and an input shaft 222 of the transmission 214. The clutch 212 has a clutch casing 228 which accommodates a rotor 224 connected to the crankshaft 220 via a damper 221. Also accommodated in the casing 228 is a hydraulically operated piston 226 which is adapted to force the rotor 224 for connection of the crankshaft 220 and the input shaft 222.

The constant-mesh transmission 214 is also adapted for use on a front-engine front-drive (FF) vehicle with the engine 210 oriented transversely of the vehicle. The input shaft 222, and an output shaft 230 are disposed within a housing 232 such that the input and output shafts 222, 230 are parallel to each other. The transmission 214 further includes a tubular intermediate shaft 231 through which the output shaft 230 extends such that the two shafts 230, 231 are rotatable relative to each other. Between the input and output shafts 222, 230, and between the input and intermediate shafts 222, 231, there are provided a plurality of pairs of gears. Described more specifically, a first-speed pair of gears disposed between the input and intermediate shafts 222, 231, consists of a first stationary gear 234 fixed to the input shaft 222, and a first rotatable shaft 236 which meshes with the first stationary gear 234 and which is rotatably supported on the intermediate shaft 231. A second-speed pair of gears disposed between the input and intermediate shafts 222, 231, consists of a second stationary gear 238 fixed to the input shaft 222, and a second rotatable shaft 240 which meshes with the second stationary gear 238 and which is rotatably supported on the intermediate shaft 231. A third-speed pair of gears disposed between the input and output shafts 222, 230, consists of a third rotatable gear 242 supported on the input shaft 222 such that the gear 242 is connected and disconnected to and from the input shaft 222 by means of a second clutch 258, and a third stationary gear 244 which meshes with the gear 242 and which is fixed to a clutch casing 264 such that the gear 244 is connected and disconnected to and from the output and intermediate shafts 230, 231 by means of a fourth clutch 262. A fourth-speed pair of gears, also disposed between the input and output shafts 222, 230, consists of a fourth rotatable gear 246 supported on the input shaft 222 such that the gear 246 is connected and disconnected to the input shaft 222 by means of a third clutch 260, and a four stationary gear 248 fixed to the output shaft 230. A fifth-speed pair of gears also disposed between the input and output shafts 222, 230, consists of a fifth stationary gear 250 fixed to the input shaft 222, and a fifth rotatable gear 252 which meshes with the fifth stationary gear 250 and which is rotatably supported on the output shaft 230. Further, a reverse drive pair of gears consists of a sixth stationary gear 254 fixed to the input shaft 222, a sixth rotatable gear 255 rotatably supported on the output shaft 230, and a reversing gear 256 meshing with the sixth stationary and rotatable gears 254, 255.

As indicated above, the second clutch 258 is disposed in a power transmission line including the third-speed pair of gears 242, 244, while the third clutch 260 is disposed in a power transmission line including the fourth-speed pair of gears 246, 248. These second and third clutches 258 and 260 are disposed in series connection with the first clutch 212. The second clutch 258, which functions as a first secondary clutch, includes a rotor 266 connected to the input shaft 222, a hydraulically operated piston 268 for forcing the rotor 266 for connection of the input and output shafts 222, 230, and a clutch casing 270 which accommodates the rotor 266 and the piston 268. The casing 270 is secured to the third rotatable gear 242 and is rotatable relative to the input shaft 222. The third clutch 260, which functions as a second secondary clutch, includes a rotor 272 connected to the input shaft 222, a hydraulically operated piston 274 for forcing the rotor 272 for connection of the input and output shafts 222, 230, and a clutch casing 276 which accommodates the rotor 272 and the piston 274. The casing 276 is secured to the fourth rotatable gear 246 and is rotatable relative to the input shaft 222. The transmission 214 is placed in its third-speed or fourth-speed position by full engagement of the second or third clutch 258, 260, respectively. Further, partial engaging actions of these second and third clutches 258, 260 prevent an interruption of power transmission from the engine 210 to the output shaft 230, when the transmission 214 is shifted to the other positions.

The fourth clutch 262, which functions as an engine-brake clutch, includes a first rotor 278 connected to the intermediate shaft 231, a second rotor 280 connected to the output shaft 230, a hydraulically operated piston 282 for forcing the first and second rotors 278, 280, and a clutch casing 264 which accommodates the rotors 278, 280. The casing 264 is supported by the output shaft 230, by means of a one-way clutch 284 which permits power transmission only in one direction toward the output shaft 230. Another one-way clutch 286 is disposed between the output and intermediate shaft 230, 231. Thus, the fourth clutch 262, the one-way clutch 284 and the one-way clutch 286 are disposed in parallel to each other, between the output and intermediate shafts 230, 231, such that power can be transmitted only in the direction from the engine 210 to the drive wheels 218.

The fourth clutch 262 constructed as described above has two engaged positions, namely, a first engaged position in which the third stationary gear 244 is connected to the intermediate shaft 231 with the first rotor 278 forced by the piston 282, and a second engaged position in which the third stationary gear 244 is connected to the output shaft 230 with the second rotor 280 forced by the piston 282. When the third stationary gear 244 is connected to the intermediate or output shaft 231, 230 by the fourth clutch 262 placed in its first or second engaged position, a drive force of the drive wheels 218 can be transmitted toward the engine 210, through the first-speed pair of gears 234, 236, second-speed pair of gears 238, 240, or third-speed pair of gears 242, 244, irrespective of the one-way clutches 284, 286. Thus, an engine brake can be applied when the fourth clutch 262 is placed in one of its two engaged positions.

The intermediate shaft 231 is provided with a first synchromesh device 288 for selectively connecting one of the first and second rotatable gears 236, 240 to the intermediate shaft 231 so that the selected one of the gears 236, 240 is rotated with the intermediate shaft 231. The output shaft 230 is provided with a second synchromesh device 289 for selectively connecting one of the fifth and sixth rotatable gears 252, 255 to the output shaft 230 so that the gear 252, 255 is rotated with the output shaft 230.

As shown in FIG. 9, the first synchromesh device 288 has the same construction as the first synchromesh device 56 of FIG. 2 used in the preceding embodiment of FIG. 1. That is, the synchromesh device 288 includes: a hub 290 secured to the intermediate shaft 231; a first sleeve 294 which is splined to the hub 290 and axially moved by a first hydraulic cylinder 292; a key 296 provided on the inner circumferential surface of the first sleeve 294 so that the key 296 is moved with the sleeve 294; a spring 298 for biasing the key 296 in the radially outward direction of the sleeve 294; externally toothed portions 300, 302 formed on the outer circumferential surfaces of the first and second rotatable gears 236, 240, respectively; and a pair of synchronizer rings 304, 306 disposed between the the first sleeve 294, and the first and second rotatable gears 236, 240, respectively. When the first sleeve 294 is moved by the first cylinder 292 toward the first rotatable gear 236, the synchronizer ring 304 is forced by the first rotatable gear 236 via the key 296. Consequently, the rotation of the first rotatable gear 236 is synchronized with the rotation of the hub 290 by means of frictional engagement of coned friction surfaces 308, 310 formed on the first rotatable gear 236 and the synchronizer ring 304. Upon synchronization of the gear 236 and the hub 390, the first sleeve 294 is permitted to be further moved, whereby the internally toothed portion of the first sleeve 294 is brought into engagement with the externally toothed portion 300 of the first rotatable gear 236. Thus, the transmission 214 is placed in its first-speed position. When the first sleeve 294 is moved toward the second rotatable gear 240, on the other hand, the sleeve 294 is brought into engagement with the externally toothed portion 302 of the second rotatable gear 240, whereby the transmission 214 is placed in its second-speed position.

The second synchromesh device 289 is identical in construction with the first synchromesh device 288. This synchromesh device 289 includes a second sleeve 316 which is splined to a hub 312 secured to the output shaft 230. The second sleeve 316 is axially moved by a second hydraulic cylinder 314. When the second sleeve 316 is engaged with the fifth rotatable gear 252, the transmission 214 is placed in its fifth-speed position. The reverse-drive position is established when the second sleeve 316 is engaged with the sixth rotatable gear 255.

As in the preceding embodiment of FIG. 1, the vehicle has: an engine-speed sensor 320 which generates the ENGINE-SPEED signal SR; an acceleration sensor 326 which generates the ACCELERATION signal SA indicative of the operating amount Acc of an accelerator pedal 324; a vehicle-speed sensor 328 which generates the VEHICLE-SPEED signal SV; an input-shaft sensor 330 which generates the INPUT-SPEED signal SI; a gear-position sensor 332 which generates the GEAR-POSITION signal SG; and a shift-position sensor 336 which generates the SHIFT-POSITION signal SL indicative of the currently selected position of a shift lever 334. These signals SR, SA, SV, SI, SG and SL are applied to the controller 322.

Like the controller 102 used in the first embodiment, the controller 322 constituted by a microcomputer includes a RAM 338, a ROM 340, a CPU 342, an input interface 344 and an output interface 346. The CPU 342 generates the DRIVE signal BD for controlling a throttle actuator 348 provided on the engine 210, and various drive signals for controlling solenoid valves 352, 354, 356, 357, 358, 359 of a hydraulic control circuit 350 for activating the first, second and third clutches 212, 258, 260, first and second hydraulic cylinders 292, 314, and fourth clutch 262 (engine-brake clutch). The hydraulic control circuit 350 is adapted to supply a pressurized fluid to the first, second and third clutches 212, 258, 260, first and second cylinders 292, 314, and fourth clutch 262.

Each of the first and second cylinders 292, 314 is constructed similarly to the cylinders 62, 82 used in the embodiment of FIG. 1. That is, the cylinder 292, 314 has: a large-diameter piston 360, 361 slidably fitted in a large-diameter portion of a stepped cylinder bore; and a small-diameter piston 364, 365 slidably fitted in a small-diameter portion of the stepped cylinder bore. The small-diameter piston 364 365 is connected to a piston rod 362, 363. With a pressurized fluid supplied to the large-diameter portion of the cylinder bore, the piston rod 362, 363 is fully advanced. The rod is moved to its fully retracted position when the fluid is supplied to the small-diameter portion of the cylinder bore. When the fluid is supplied to the large-diameter and small-diameter portions, the rod 362, 363 is placed in its neutral position. The piston rod 362 of the first cylinder 292 is connected to a shift fork 366, while the piston rod 363 of the second cylinder 312 is connected to a shift fork 367. In the above arrangement, the first cylinder 292 is operated to move the first sleeve 294 of the first synchromesh device 288 through the shift fork 366, to one of three positions, i.e., neutral position, first-speed position (on the side of the first rotatable gear 236) and second speed-speed position (on the side of the second rotatable gear 240). Similarly, the second cylinder 314 is operated to move the second sleeve 316 of the second synchromesh device 289 through the shift fork 367, to one of three positions, i.e., neutral position, fifth-speed position and reverse-drive position.

In an intake manifold of the engine 210, there is disposed a throttle valve 368 which is activated by the throttle actuator 348 indicated above. Normally, the throttle valve 368 is controlled in response to the DRIVE signal BD from the controller 322, so that the throttle opening corresponds to the operating amount Acc of the accelerator pedal 324. The solenoid valves 352, 354 are adapted to supply the pressurized fluid to the first and second hydraulic cylinders 292, 314, so as to establish the appropriate gear position of the transmission 214. The solenoid valves 356, 357, 358 are adapted to supply the fluid to the first, second and third clutches 212, 258, 260, for activating the piston 226, 268, 274 for frictional full or partial engaging actions of the clutches. The solenoid valve 359 is adapted to supply the fluid to the fourth clutch 262, for activating the piston 282, in order to apply an engine brake to the vehicle.

There will be described an operation of the present embodiment of the invention.

Figure 10:
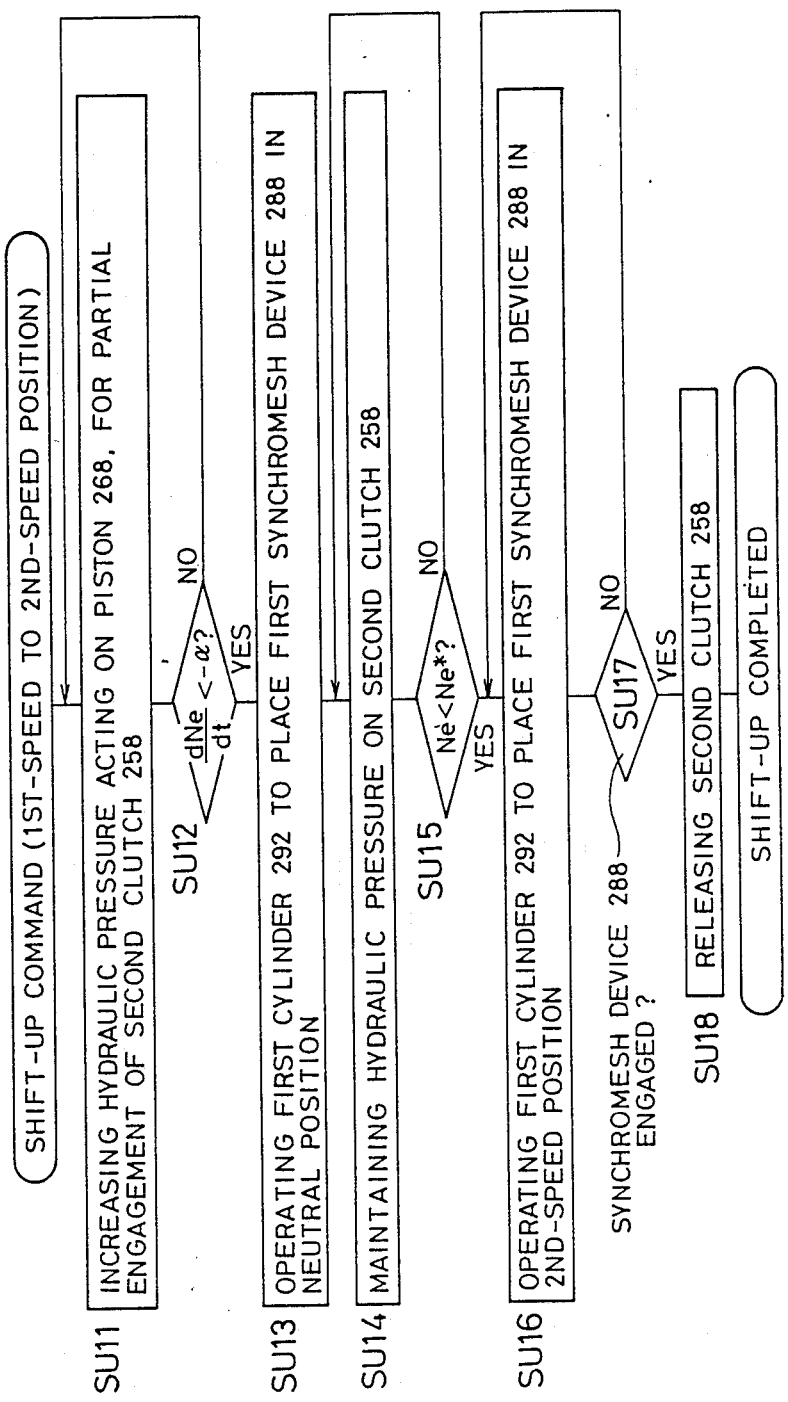
FIGS. 10 and 11 are flow charts illustrating a shift-up operation of the automatic transmission of FIG. 8.
Figure 11:
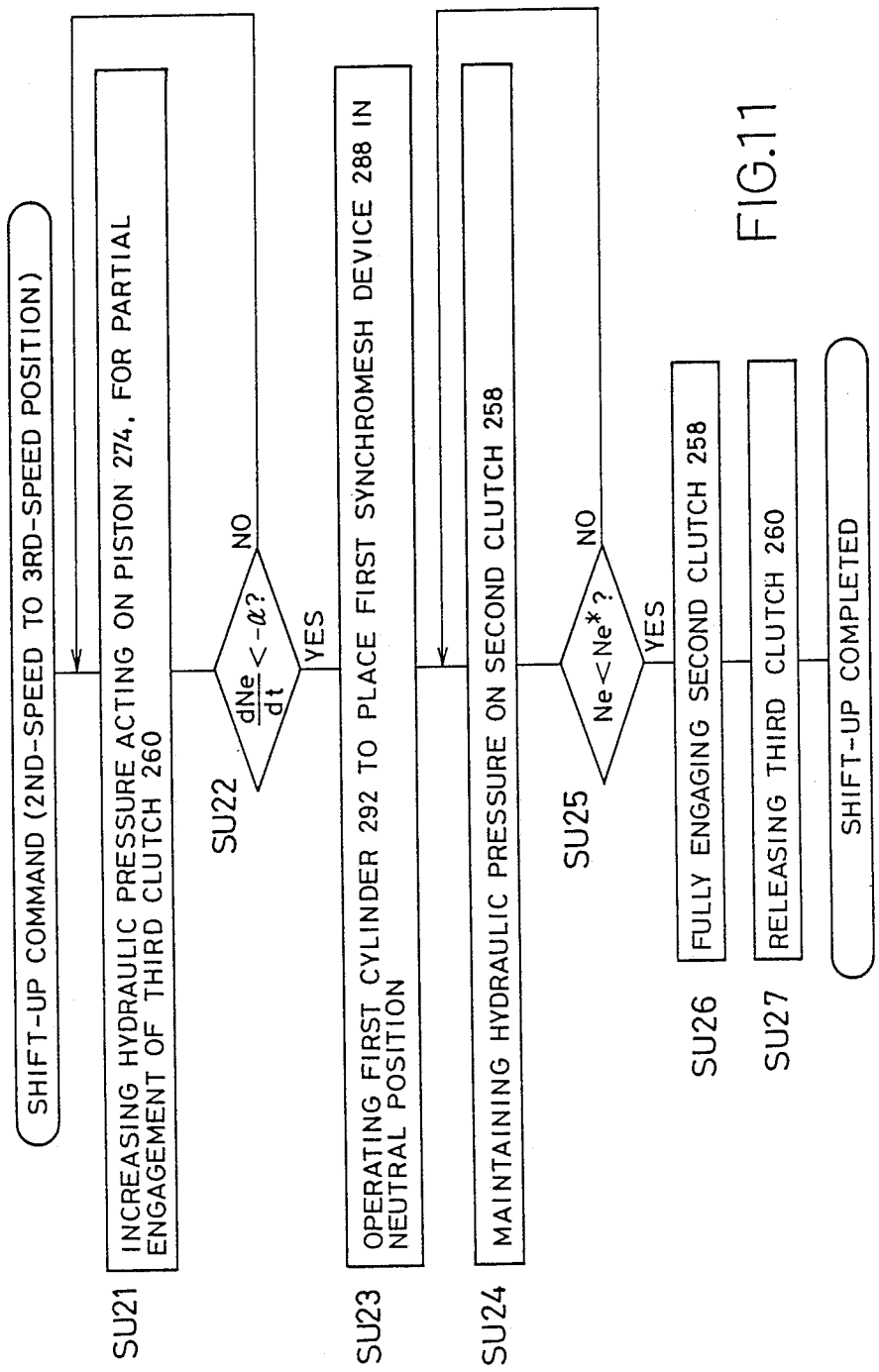
Figure 12:
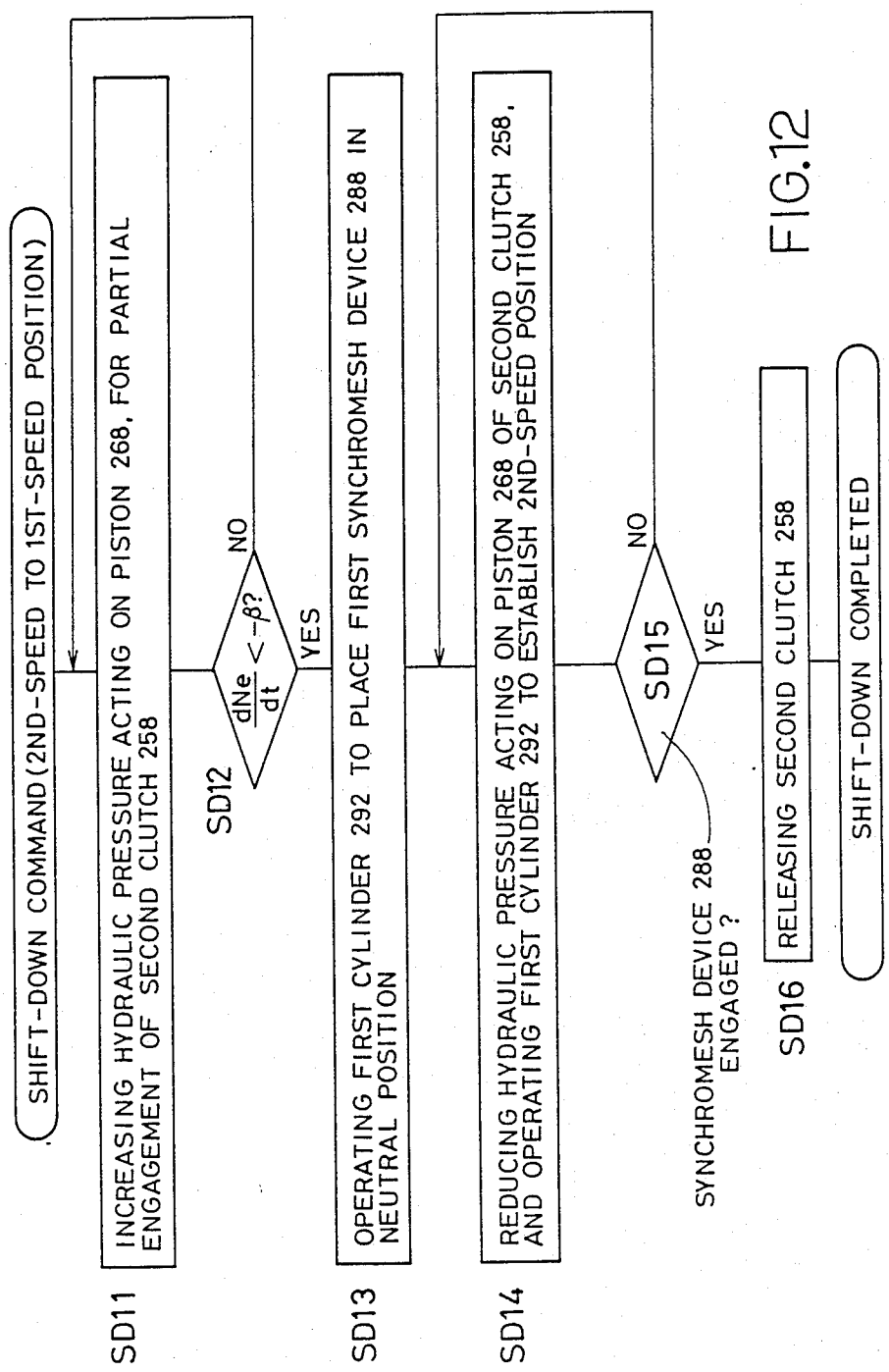
FIGS. 12 and 13 are flow charts illustrating a shift-down operation of the transmission of FIG. 8.
Figure 13:
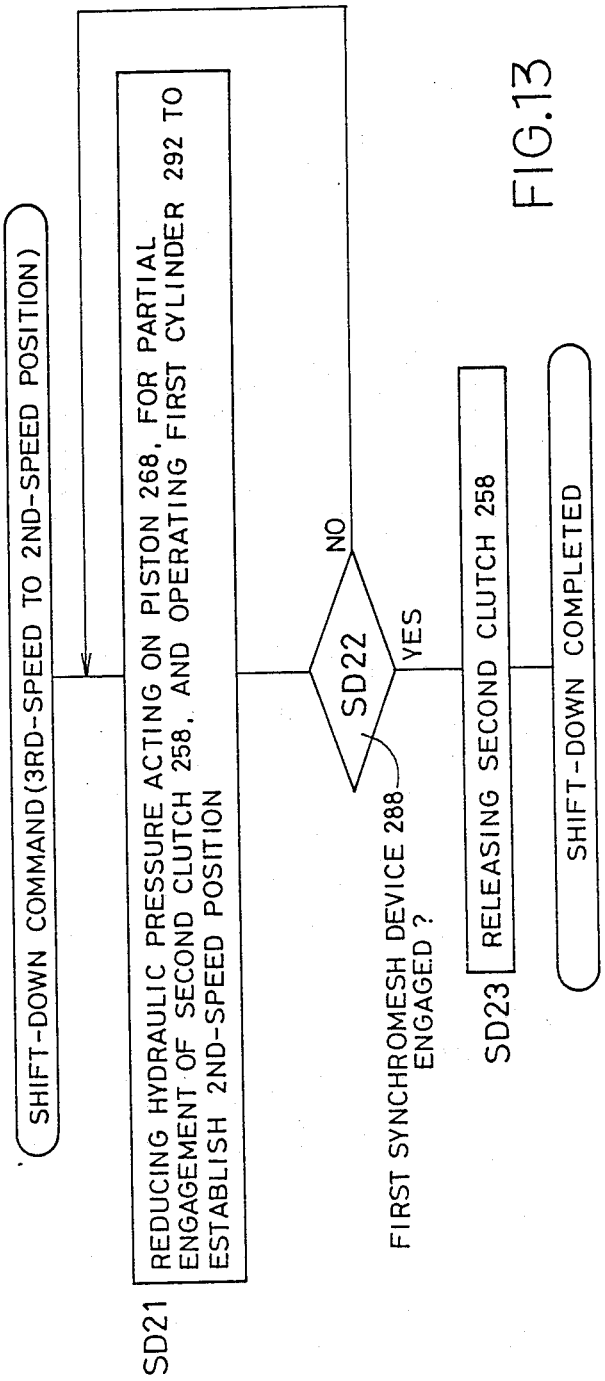

When the shift mode is selected while the vehicle is running, the CPU 342 commands the solenoid valve 356 so as to hold the first clutch 212 in the engaged position. When the engine-brake mode is selected, the CPU 342 commands the solenoid valve 359 so as to engage the fourth clutch 262. In the shift mode, the CPU 342 selects one of a plurality of shift patterns (shift diagrams) stored in the ROM 340, based on the currently selected position of the transmission 214, and generates shifting commands to obtain an optimum position of the transmission 214, based on the detected vehicle speed V and the detected operating amount Acc of the accelerator pedal 324, and according to the selected shift pattern. When the CPU 342 determines to shift the transmission 214 from the currently selected position to another, this shifting is automatically effected in a predetermined sequence. For example, if the CPU 342 generates a shift-up command while the transmission 214 is placed in its first-speed position, the transmission 214 is automatically shifted up to the second-speed position in a sequence as illustrated in FIG. 10. If the CPU 342 generates a shift-up command while the transmission 214 is placed in its second-speed position, the transmission 214 is automatically shifted up to the third-speed position in a sequence as illustrated in FIG. 11. If a shift-down command is generated while the transmission 214 is in the second-speed position, the transmission 214 is automatically shifted down to the first-speed position in a sequence as illustrated in FIG. 12. If a shift-down command is generated while the transmission 214 is in the third-speed position, the transmission 214 is automatically shifted down to the second-speed position in a sequence as illustrated in FIG. 13. While the above shift-up or shift-down operations are performed, the opening of the throttle valve 368 is kept constant, and the first clutch 212 is held in its fully engaged position.

When the transmission 214 is shifted up from the first-speed position to the second-speed position, step SU11 of FIG. 10 is initially executed, to commence a supply of the pressurized fluid to the second clutch 258 (which has been kept in its disengaged position). The commencement of the fluid supply to the second clutch 258 is indicated at "A" in FIG. 14. As the fluid pressure acting on the piston 268 of the second clutch 258 is increased, the clutch 258 is partially engaged, and the output torque of the transmission 214 is reduced. At the same time, the engine speed Ne begins to be lowered, since the load exerted on the engine 210 is increased. This point of time is indicated at "B" in FIG. 14. In step SU12, the CPU 342 checks if whether or not a rate of change (dNe/dt) of the engine speed Ne is smaller than a predetermined value—$\alpha$, in order to determine the point "B" at which the engine speed Ne begins to be lowered. When the CPU 342 has detected the point "B" in step SU12, the CPU 342 goes to step SU13 in which the solenoid valve 352 is commanded to control the first hydraulic cylinder 292 so that the first sleeve 294 of the first synchromesh device 288 is placed in its neutral position. In the next step SU14, the hydraulic pressure acting on the piston 268 of the second clutch 258 is maintained to hold the partial engagement of the clutch 258. As a result, the engine speed Ne is continuously lowered. During this period, the output torque of the transmission 214 is slightly increased due to an inertia energy of the engine 210. Further, the torque transmitted by the first-speed gears 234, 236 is reduced so as to permit the first sleeve 294 to be moved to the neutral position, when the engine speed Ne substantially coincides with the speed which is to be obtained when the transmission 214 is placed in the second-speed position with the vehicle speed V kept constant.

Step SU14 is followed by step SU15 in which the CPU 342 selects a target engine speed N1* from among a plurality of target values stored in the ROM 340, depending upon the first-speed position of the transmission 214. Then, the CPU 342 determines whether or not the actual engine speed Ne has been lowered down to the selected target speed N1*. This target value N1* is determined such that the value N1* is slightly lower than an engine speed N2 which is obtained in the newly selected second-speed position of the transmission 214. For instance, the ROM 340 store a predetermined formula for calculating an engine speed Ne which is to be established when the transmission 214 is shifted from one position to another, and the CPU 342 calculates a target value of the engine speed Ne, based on the currently selected position of the transmission 214 and the current speed of the vehicle, and according to the stored formula.

When the CPU 122 determines in step SU15 that the actual engine speed Ne has been lowered to the target engine speed N1*, step SU16 is executed to operate the first hydraulic cylinder 292 for biasing or forcing the first sleeve 294 toward the second-speed position on the side of the second rotatable gear 240. This point of time is indicated at "C" in FIG. 14. Consequently, the intermediate shaft 231 is synchronized with the second rotatable gear 240 by the first synchromesh device 288. This synchronization between the intermediate shaft 231 and the second rotatable gear 240 is facilitated by the one-way clutch 286, since the actual engine speed Ne is held lower than the target speed N1*. Therefore, the first sleeve 294 of the first synchromesh device 288 can be smoothly shifted from the neutral position to the second-speed position in which the intermediate shaft 231 is rotated with the second rotatable gear 240. Thus, the transmission 214 is shifted up to the second-speed position.

Figure 14:
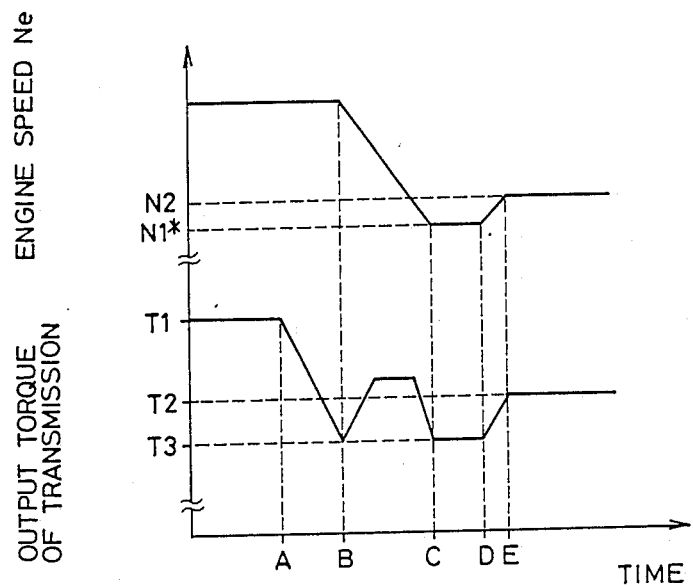
FIG. 14 is a graph indicating changes in the operating speed of the engine and the output torque of the transmission, during the shift-up operation of FIG. 10.

The CPU 122 then goes to step SU17 to check if the transmission 214 has been shifted up to the second-speed position with the first sleeve 294 fully engaged with the second rotatable gear 240. If an affirmative decision is obtained, step SU17 is followed by step SU18 wherein the hydraulic pressure which has been acting on the second clutch 258 is released. In consequence, the actual engine speed Ne begins to rise as indicated at "D" in FIG. 14, and the torque transmitted by the second clutch 258 begins to be reduced. When the transmission torque of the second clutch 258 has been reduced to zero as indicated at "E" in FIG. 14, the output of the engine 210 is transmitted to the output shaft 230, solely through a transmission line which includes the second-speed pair of gears 238, 240, first synchromesh device 288 and one-way clutch 286. Therefore, the engine speed Ne is changed to a level N2 corresponding to the second-speed position of the transmission 214, and the output torque of the transmission 214 is held at a level T2 as indicated in FIG. 14. It is noted that the operating time between the points "A" and "E" of FIG. 14 is approximately 0.4 second. In the figure, "T1" represents the output torque of the transmission 214 when the transmission is placed in its first-speed position, and "T2" and "T3" represent the output torque when the transmission 214 is placed in its second-speed and third-speed positions, respectively.

When a shift-up command is generated to shift up the transmission 214 from the second-speed position to the third-speed position, the shift-up operation is effected in a sequence as shown in FIG. 11. Initially, step SU21 is executed to commence a supply of the pressurized fluid to the third clutch 260. As the fluid pressure acting on the piston 274 of the third clutch 260 is increased, the engine speed Ne begins to be lowered. When the commencement of the lowering of the engine speed Ne is detected in step SU22 similar to step SU12 of FIG. 10, the CPU 342 goes to step SU23 in which the pressurized fluid is supplied to the first hydraulic cylinder 292, so that the first sleeve 294 of the first synchromesh device 288 is placed in its neutral position. In the next step SU24, the hydraulic pressure acting on the piston 274 of the third clutch 260 is maintained to hold the partial engagement of the clutch 260. Then, step SU25 similar to step SU15 is executed to determine a target engine speed N2* which is slightly lower than a speed of the engine 210 which is to be obtained when the transmission 214 is placed in the third-speed position with the vehicle speed V held constant. In this step SU25, the CPU 342 determines whether the actual engine speed Ne has been lowered to the determined target speed N2*, or not. If an affirmative decision is obtained in step SU25, step SU26 is executed to fully engage the second clutch 258. Then, step SU27 is executed to release the hydraulic pressure from the third clutch 260 which has been held in partially engaged state.

As is apparent from the above description, the transmission of power from the engine 210 to the drive wheels 218 will not be interrupted even while the transmission 214 is in a shift-up action from the first-speed or second-speed position, since the power is transmitted through the partially engaged second clutch 258 and the third-speed pair of gears 242, 244, or the partially engaged third clutch 260 and the fourth-speed pair of gears 246, 248. Accordingly, the shift-up action to the second-speed or third-speed position of the transmission 214 can be achieved in a smooth manner without a shifting shock.

Since the above shift-up operation to the second-speed position, for example, is carried out with the second clutch 258 partially engaged while the first clutch 212 is held in its fully engaged position, the second-speed position is established when the actual engine speed Ne has been lowered below the target speed N1* and the one-way clutch 286 has begun to slip slightly. According to this arrangement, the controller 322 does not require such an intricate timing control of disengaging and engaging actions of the clutches, as required in the conventional arrangement wherein the primary and secondary clutches are disposed in parallel. Hence, the present embodiment does not suffer from a shifting shock and a racing of the engine 210, due to inadequate timing control of the two clutches, and the controller 322 can be significantly simplified.

Further, the torque transmitted by the partially engaged second clutch 258 during the shift-up operation from the first-speed position to the second-speed position is transmitted to the output shaft 230 at the speed reduction ratio of the third-speed pair of gears 242, 244. In this case, the durability of the second clutch 258 is improved, and a variation in the torque transmitted during the shifting action of the transmission 214 can be made smaller, as compared with that where the torque is transmitted at the speed reduction ratio of the fourth-speed pair of gears.

Figure 15:
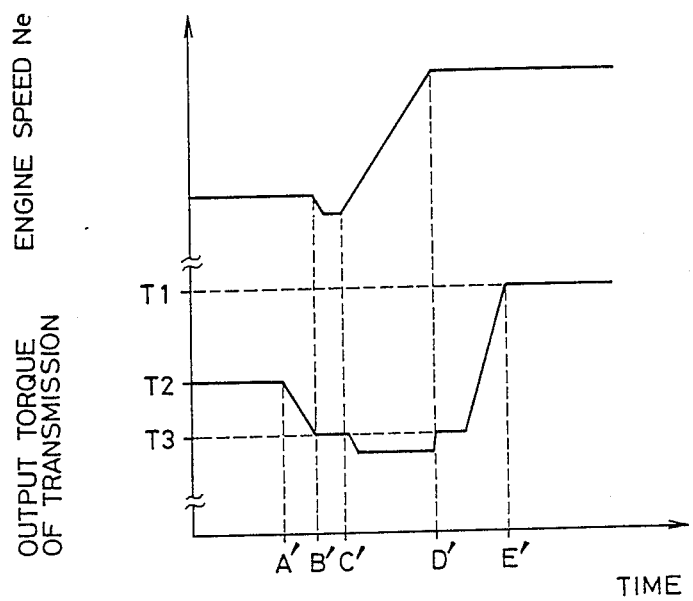
FIG. 15 is a graph indicating changes in the engine speed and the transmission output torque, during the shift-down operation of FIG. 12.

Referring next to FIGS. 12, 13 and 15, shift-down operations of the transmission 214 will be described.

In an example shown in FIG. 12, the transmission 214 is commanded to be shifted from the second-speed position to the first-speed position. Initially, step SD11 is implemented to apply the pressurized fluid to the piston 268 of the second clutch 258 which has been held disengaged. This point of time is indicated at "A'" in FIG. 15. Thus, the second clutch 258 is placed in the partially engaged position, and power from the engine 210 is transmitted through this partially engaged second clutch 258. As a result, the power transmitted by the first synchromesh device 288 begins to be reduced, and the engine speed Ne begins to be lowered, since the load exerted on the engine 210 is increased. This point of time is indicated at "B'" in FIG. 15.

In step SD12, the CPU 342 checks if whether or not a rate of change (dNe/dt) of the engine speed Ne is smaller than a predetermined value $-\beta$, in order to determine the point "B'" at which the engine speed Ne begins to be lowered. When the CPU 342 has detected the point "B'" in step SD12, the CPU 342 goes to step SD13 in which the solenoid valve 352 is commanded to control the first hydraulic cylinder 292 so that the first sleeve 294 of the first synchromesh device 288 is placed in its neutral position. As described above, the engine speed Ne has been lowered from the second-speed level, and the first synchromesh device 288 is freed by the one-way clutch 286. Accordingly, no load is applied to the first synchromesh device 288, and consequently the first sleeve 294 can be smoothly moved to its neutral position. Then, step SD14 is executed to reduce the hydraulic pressure acting on the piston 268 of the second clutch 258. Further, the solenoid valve 352 is commanded to supply the pressurized fluid to the first hydraulic cylinder 292, for moving the first sleeve 294 of the first synchromesh device 288 from the neutral position to the first-speed position on the side of the first rotatable gear 236. This point of time is indicated at "C'" in FIG. 15.

As the partial engagement of the second clutch 258 is reduced, the load exerted on the engine 210 is decreased, whereby the engine speed Ne rises up to the first-speed level. The first sleeve 294 of the first synchromesh device 288 is moved to its first-speed position. Thereafter, the one-way clutch 86 is engaged. This point of time is indicated at "D'" in FIG. 15. When this state is detected in step SD15, the CPU 342 goes to step SD16 to release the hydraulic pressure which has been acting on the second clutch 258, whereby the torque transmitted by the second clutch 258 is zeroed. As a result, the power from the engine 10 is transmitted solely through the first-speed pair of gears 234, 236 and the first synchromesh device 288. Accordingly, the output torque of the transmission 214 is increased to a level T1 as indicated at "E'" in FIG. 15. In the figure, "T1" represents the output torque of the transmission 214 when the transmission is placed in its first-speed position.

When a command to shift down the transmission 214 from the third-speed position to the second-speed position, the shift-down operation is automatically executed in a sequence as shown in FIG. 13. Initially, the CPU 342 executes step SD21 to reduce the hydraulic pressure acting on the piston 268 of the second clutch 258, and activate the first hydraulic cylinder 292 to force the first sleeve 294 in the direction from the neutral position to the second-speed position (toward the second rotatable gear 240). As the engagement of the second clutch 258 is reduced, the load exerted on the engine 210 is reduced, and the engine speed Ne rises to a level which is to be established when the transmission 214 is placed in the second-speed position with the current vehicle speed held constant. During this period, the first sleeve 294 can be shifted to the second-speed position for engagement with the second rotatable gear 240. If this engagement of the first sleeve 294 and the second rotatable gear 240 is detected in step SD22, the CPU 342 goes to step SD23 in which the hydraulic pressure is removed from the piston 268 of the second clutch 258, whereby the clutch 258 is disengaged.

As in the shift-up operation previously discussed, the transmission of power from the engine 210 to the drive wheels 218 will not be interrupted while the transmission 214 is in a shift-down action from the second-speed or third-speed position, down to the first-speed or second-speed position. Further, the shift-down operation is accomplished while the second clutch 258 is partially engaged, with the first clutch 212 held in the fully engaged position. Therefore, the power transmitting system can be readily controlled, without an intricate timing control of the clutches, and without causing a shifting shock or a racing of the engine 210.

A shifting of the transmission 214 from the third-speed position to the fourth-speed position is automatically effected under the control of the controller 322. Namely, the throttle valve 368 is closed, and the second clutch 258 is disengaged. Then, the third clutch 260 is partially engaged, and the throttle valve 368 is restored to the original position. When the transmission 214 is shifted up to from the fourth-speed position to the fifth-speed position, the throttle valve 368 is closed, and the third clutch 260 is disengaged. Then, the second hydraulic cylinder 314 is operated to move the second sleeve 316 of the second synchromesh device 289, for engagement of the second sleeve 316 with the fifth rotatable gear 252. In these shift-up operations from the third-speed to the fourth-speed position, and from the fourth-speed to the fifth-speed position, the throttle valve 368 is temporarily placed in its fully closed position, and the drive torque is reduced. However, the temporary interruption of the power transmission at this time does not matter, since the drive force of the vehicle is small enough because of the relatively low speed reduction ratios of the third-speed and fourth-speed pairs of gears 242, 244 and 246, 248. The shift-down operations from the fifth-speed to the fourth-speed position, and from the fourth-speed to the third-speed position, are automatically effected in a sequence reversed to the sequence of the shift-up operations.

When the CPU 342 determines, based on parameters such as a gradient of the road surface, a running speed of the vehicle and an operating amount of the accelerator pedal 324, that an engine brake must be applied to the vehicle, the CPU 342 commands the solenoid valve 359 to supply the pressurized fluid to the fourth or engine-brake clutch 262, for coupling the intermediate shaft 231 and the output shaft 230. As a result, the drive force of the drive wheels 218 can be transmitted to the engine 210, via the engaged engine-brake clutch 262, whereby an engine-brake is applied to the vehicle. Normally, the application of an engine brake is inhibited by the one-way clutches 284 and 286.

In the present embodiment of the automatic transmission system of FIG. 8 described above, a shifting operation between two adjacent low-speed positions of the transmission 214 is achieved while the second clutch 258 is in partially engaged position and while the first clutch 212 is held fully engaged. This arrangement eliminates difficult timing control of the disengaging and engaging actions of the clutches, as required in the conventional arrangement wherein the primary and secondary clutches are disposed in parallel. Thus, the instant arrangement does not suffer from a shock or a racing phenomenon of the engine 10, upon shifting of the transmission 14.

Further, the one-way clutches 284, 286 inhibit the application of an engine brake, unless the engine-brake clutch 262 is engaged. This arrangement makes it possible to minimize the energy loss due to unnecessary application of an engine brake, and improve the fuel economy of the vehicle. Nevertheless, an engine brake can be applied when needed, by activating the engine-brake or fourth clutch 262 to its engaged position.

In the present embodiment, the second clutch 258 is provided so as to connect the input shaft 222 to the third-speed pair of gears 242, 244, while the third clutch 260 is provided so as to connect the input shaft 222 to the fourth-speed pair of gears 246, 248. In the shift-up action from the first-speed position to the second-speed position, the second clutch 258 is partially engaged. In the shift-up action from the second-speed position to the third-speed position, the third clutch 260 is partially engaged. This arrangement permits a relatively large drive torque to be transmitted to the output shaft 230. Accordingly, the present embodiment assures a comparatively small variation in the output torque of the transmission 214, and a comparatively small amount of slip of the second and third clutches 258, 260, which indicates improved durability of these clutches.

Referring next to FIG. 16, a further embodiment of the invention will be described. In the interest of brevity and simplification, the same reference numerals as used in FIG. 8 will be used to identify the corresponding elements, and redundant description of these elements will not be provided herein.

In the transmission 214 of the present embodiment, the input shaft 222 rotatably supports a seventh rotatable gear 370 such that the gear 370 is rotatable relative to the shaft 222. This seventh rotatable gear 370 meshes with a seventh stationary gear 372 fixed to the output shaft 230. These seventh rotatable and stationary gears 370, 372 are provided to transmit power from the input shaft 222 to the output shaft 230 while the transmission 214 is in a shifting operation between the first-speed and second-speed positions. The numbers of teeth of the seventh pair of gears 370, 372 are determined so as to provide a speed reduction ratio which is intermediate between those of the second-speed and third-speed pairs of gears 238, 240 and 242, 244. The second clutch 258 is fixed to the input shaft 222 and to the seventh rotatable gear 370, so that the input shaft 222 is connected to the output shaft 230 via the seventh pair of gears 370, 372 when the second clutch 258 is engaged. In the present embodiment, the third-speed pair of gears 242, 244, sixth stationary gear 254, reverse-drive gear 256 and sixth rotatable gear 255, are disposed between the input shaft 222 and the intermediate shaft 231. A third hydraulic cylinder 374 is provided to activate a third synchromesh device 376, for selectively connecting the third rotatable gear 242 or the sixth rotatable gear 255 to the intermediate shaft 231.

In the present arrangement, a torque is transmitted from the input shaft 22 to the output shaft 230 by means of partial engagement of the second clutch 258, via the seventh pair of gears 370, 372, while the transmission 214 is shifted between the first-speed and second-speed positions. This torque transmitted through the second clutch 258 is larger than those transmitted by the second clutch 54 of FIG. 1 or FIG. 7, and second and third clutches 258, 260 of FIG. 8. Accordingly, the second clutch 258 of the present embodiment has a reduced variation in the torque transmitted during its partial engagement, and therefore its durability is improved.

While the present invention has been described in its preferred embodiments with a certain degree of particularity, it is to be understood that the invention is not limited to the precise details of the illustrated embodiment, but may be otherwise embodied.

While the embodiments of FIGS. 1 and 8 use the intermediate shaft 31, 231 disposed radially outwardly of the output shaft 30, 230 such that the two shafts are rotatable relative to each other, the intermediate shaft 31, 231 may be disposed radially outwardly of the input shaft 22, 222. In this case, the pairs of power transmission gears, one-way clutch 85, 286, and engine-brake clutch 86, 262 are disposed between the intermediate shaft 31, 231 and the output shaft 30, 230.

In the embodiment of FIG. 1, the second clutch 54 is provided in operative association with the fourth-speed pair of gears. The clutch 54 may be disposed in association with the third-speed pair of gears.

Although the illustrated embodiments of FIGS. 1 and 7 uses a total of five pairs of power transmission gears to provide five forward drive positions, it is possible to use four or three pairs of gears to provide four or three forward drive positions. Similarly, the number of forward drive position of the transmission 214 of FIGS. 8 and 16 may be changed as needed.

While the first synchromesh device 56, 288 shown in FIG. 2 or FIG. 9 by way of example, for selective engagement of the intermediate shaft 31, 231 with the first or second rotatable gear 36, 236, 40, 240, has the pair of synchronizer rings 74, 76, or 304, 306, these rings may be eliminated, since the partial engagement of the second clutch 54, 258 facilitates synchronization of the intermediate shaft 31 with the rotatable gear 36, 236, 40, 240.

It is to be understood that various other changes, modifications and improvements may be made in the invention, without departing from the spirit and scope of the invention defined in the appended claims.

What is claimed is:

1. An automatic transmission for an automotive vehicle, including an input shaft connected to an engine of the vehicle via a primary clutch, an output shaft parallel to said input shaft and operatively connected to drive wheels of the vehicle, a plurality of pairs of gears for transmitting a drive force of the input shaft tot he output shaft at different speed reduction ratios, respectively, at least one shift member for selecting one of said pairs of gears into an operative position, and an actuator device for automatically activating said at least one shift member, comprising:

second clutch means connected to said primary clutch by said input shaft, for engaging said input shaft with said output shaft;

an intermediate shaft operatively connecting said input shaft to said output shaft, said intermediate shaft being provided with one of the gears of each of at least one of said pairs of gears;

a one-way clutch disposed between said intermediate shaft and one of said input and output shafts, said one-way clutch permitting power to be transmitted only in a direction from said input shaft toward said output shaft; and control means for controlling said actuator device, said primary clutch and said secondary clutch means, said control means operating said actuator device to place said selected one of said pairs of gears in said operative position while holding said primary clutch in a fully engaged position thereof and said secondary clutch means in a partially engaged position thereof.

2. An automatic transmission according to claim 1, wherein said intermediate shaft comprises a sleeve disposed concentrically with and radially outwardly of said output shaft, the other of said gears of said each of said at least one pair of gears being provided on said input shaft.

3. An automatic transmission according to claim 2, wherein said secondary clutch means comprises a secondary clutch disposed so as to engage one end of said input shaft remote from said engine, to one end of said output shaft closest to said one end of said input shaft.

4. An automatic transmission according to claim 1, wherein said input and output shafts are disposed in line with each other parallel to axes of rotation thereof, and said intermediate shaft comprises a sleeve disposed concentrically with and radially outwardly of said output shaft, said automatic transmission further comprising a countershaft which is disposed in parallel to said input and output shafts and operatively connected to said input shaft, the other of said gears of said each of said at least one pair of gears being provided on said countershaft.

5. An automatic transmission according to claim 4, wherein said secondary clutch means comprises a secondary clutch disposed between one end of said input shaft remote from said engine, and one end of said output shaft adjacent to said one end of said input shaft.

6. An automatic transmission according to claim 1, wherein said primary clutch incorporates a damper for absorbing a shock.

7. An automatic transmission according to claim 1, further comprising an engine-brake clutch disposed in operatively parallel relation with said one-way clutch, said engine-brake clutch being engaged to permit power to be transmitted from said output shaft to said input shaft, and thereby permit an engine brake to be applied to the vehicle.

8. An automatic transmission according to claim 7, wherein said one-way clutch is disposed within a casing to said engine-brake clutch.

9. An automatic transmission according to claim 1, wherein said actuator device is a hydraulically operated actuator.

10. An automatic transmission according to claim 1, wherein said at least one shift member includes at least one synchromesh device for synchronizing said output shaft with the selected one of said pairs of gears.

11. An automatic transmission for an automotive vehicle, including an input shaft connected to an engine of the vehicle via a primary clutch, an output shaft parallel to said input shaft and operatively connected to drive wheels of the vehicle, a plurality of pairs of gears for transmitting a drive force of the input shaft to the output shaft at different speed reduction ratios, respectively, at least one shift member for selecting one of said pairs of gears into an operative position, and an actuator device for automatically activating said at least one shift member, comprising:
 a secondary clutch connected to said primary clutch by said input shaft, and disposed so as to engage said input shaft with said output shaft:
 an intermediate shaft operatively connecting said input shaft to said output shaft, said intermediate shaft being provided with one of the gears of each of at lest one of said pairs of gears;
 a one-way clutch disposed between said intermediate shaft and one of said input and output shafts, said one-way clutch permitting power to be transmitted only in a direction from said input shaft toward said output shaft;
 an engine-brake clutch disposed in operatively parallel relation with said one-way clutch, said engine-brake clutch being engaged to permit power to be transmitted from said output shaft to said input shaft, and thereby permit an engine brake to be applied to the vehicle; and
 control means for controlling said actuator device, said primary and secondary clutches, and said engine-brake clutch, said control means operating said actuator device to place said selected one of said pairs of gears in said operative position while holding said primary clutch in a fully engaged position thereof and said secondary clutch in a partially engaged position thereof, said control means activating said engine-brake clutch to apply the engine brake to the vehicle, depending upon running conditions of the vehicle.

12. An automatic transmission for an automotive vehicle, including an input shaft connected to an engine of the vehicle via a primary clutch, an output shaft parallel to said input shaft and operatively connected to drive wheels of the vehicle, a plurality of pairs of gears for transmitting a drive force of the input shaft to the output shaft at different speed reduction ratios, respectively, at least one shift member for selecting one of said pairs of gears into an operative position, and an actuator device for automatically activating said at least one shift member, comprising:
 a secondary clutch connected to said clutch by said input shaft, and disposed so as to engage said input shaft with said output shaft;
 an intermediate shaft comprising a sleeve disposed concentrically with and radially outwardly of said output shaft for operatively connecting said input shaft to said output shaft, said sleeve having one of the gears of each of at least two pairs of said plurality of pairs of gears;
 said input shaft having the other of said gears of said each of said at least two pairs of gears;
 at least one of said at least one shift members being operable to select one of said at least two pairs of gears into said operative position; and
 a one-way clutch disposed between said intermediate shaft and one of said input and output shafts, said one-way clutch permitting power to be transmitted only in a direction from said input shaft toward said output shaft, when each of said at least two pairs of gears is placed into said operative position.

13. An automatic transmission according to claim 12, wherein said one-way clutch is disposed between said sleeve of said intermediate shaft and said output shaft.

14. An automatic transmission according to claim 12, wherein said plurality of pairs of gears consist of a first, a second, a third, a fourth and a fifth pair of gears for establishing a first-speed, a second-speed, a third-speed, a fourth-speed, and a fifth-speed position of the transmission, said sleeve having one of said fourth pair of gears while said input shaft having the other of said fourth pair of gears, said secondary clutch being operable to connect said fourth pair of gears to each other to thereby transmit the drive force of the input shaft to the output shaft through said fourth, pair of gears.

15. An automatic transmission according to claim 14, wherein said first, second, third, and fifth pairs of gears are disposed on said input shaft and said sleeve of the intermediate shaft, in the order of description in a direction from said engine toward said secondary clutch, said at least one of said at least one shift member comprising a first shift member disposed between said other gear of said first pair of gears and said other gear of said second pair of gears which are disposed on said sleeve, and a second shift member disposed between said other gear of said third pair of gears and said other gear of said fifth pair of gears which are disposed on said sleeve.

* * * * *